United States Patent
Ueda et al.

(10) Patent No.: US 7,945,948 B2
(45) Date of Patent: May 17, 2011

(54) SYSTEM, METHOD AND PROGRAM FOR OFF-LINE USER AUTHENTICATION

(75) Inventors: Yukiya Ueda, Tokyo (JP); Tsugune Saito, Tokyo (JP); Shigetomo Tamai, Tokyo (JP)

(73) Assignee: Computer Systems Engineering Co., Ltd., Tokyo (JP)

( * ) Notice: Subject to any disclaimer, the term of this patent is extended or adjusted under 35 U.S.C. 154(b) by 1097 days.

(21) Appl. No.: 11/450,536

(22) Filed: Jun. 9, 2006

(65) Prior Publication Data
US 2007/0234063 A1    Oct. 4, 2007

(30) Foreign Application Priority Data

Mar. 30, 2006 (JP) ................. 2006-094782

(51) Int. Cl.
*G06F 7/04* (2006.01)
*G06F 15/16* (2006.01)
*G06F 17/30* (2006.01)
*H04L 29/06* (2006.01)

(52) U.S. Cl. ............. 726/5; 726/6; 726/17; 726/18; 726/19; 713/168; 713/169; 713/182; 713/183; 713/184; 713/186; 380/54; 382/115; 706/47

(58) Field of Classification Search .............. 713/168, 713/169, 183, 184, 182, 186; 726/5, 17, 726/18, 19, 6; 380/54; 706/47; 382/115
See application file for complete search history.

(56) References Cited

U.S. PATENT DOCUMENTS

| | | | | |
|---|---|---|---|---|
| 4,423,287 A | * | 12/1983 | Zeidler | ............ 705/71 |
| 5,655,077 A | * | 8/1997 | Jones et al. | ............ 726/8 |
| 6,324,646 B1 | | 11/2001 | Chen et al. | |
| 6,523,067 B2 | | 2/2003 | Mi et al. | |
| 6,732,282 B1 | * | 5/2004 | Brelin | ............ 713/300 |

(Continued)

FOREIGN PATENT DOCUMENTS

JP  2002-91919 A  3/2002

(Continued)

OTHER PUBLICATIONS

Japanese Office Action: Notification of Reason(s) for Rejection, for application No. JP2006-094782, mailed Apr. 2, 2007.

(Continued)

*Primary Examiner* — Edan Orgad
*Assistant Examiner* — Kari L Schmidt
(74) *Attorney, Agent, or Firm* — Blakely Sokoloff Taylor & Zafman LLP

(57) ABSTRACT

Disclosed is an off-line user authentication system, which is designed to present a presentation pattern to a user subject to authentication, and apply a one-time-password derivation rule serving as a password to certain pattern elements included in the presentation pattern at specific positions so as to create a one-time password. An off-line authentication client pre-stores a plurality of pattern element sequences each adapted to form a presentation pattern, and a plurality of verification codes created by applying a one-time-password derivation rule to the respective presentation patterns and subjecting the obtained results to a one-way function algorism. A presentation pattern is created using one selected from the stored pattern element sequences, and presented to a user. A one-time password entered from the user is verified based on a corresponding verification code to perform user authentication. The present invention provides an off-line matrix authentication scheme with enhanced security.

14 Claims, 16 Drawing Sheets

U.S. PATENT DOCUMENTS

| | | |
|---|---|---|
| 6,898,711 B1 | 5/2005 | Bauman et al. |
| 2002/0013904 A1* | 1/2002 | Gardner ................ 713/184 |
| 2002/0157029 A1* | 10/2002 | French et al. ............ 713/202 |
| 2005/0160297 A1 | 7/2005 | Ogawa |
| 2005/0182946 A1 | 8/2005 | Shatford |
| 2005/0254650 A1 | 11/2005 | Sakurai et al. |
| 2006/0235801 A1* | 10/2006 | Strom et al. ............ 705/59 |

FOREIGN PATENT DOCUMENTS

| | | |
|---|---|---|
| JP | 2005-25575 A | 1/2005 |
| JP | 2005-196800 A | 7/2005 |
| JP | 2006-39997 A | 2/2006 |
| WO | WO 03/069490 A1 | 8/2003 |
| WO | WO2004/025488 | 3/2004 |

OTHER PUBLICATIONS

Taizu Ohnishi & Associates IT Conference, "Learn from Base Technologies -Mobile Management-", IT Select, Mediaselect Inc., Feb. 1, 2002, pp. 56 to 60.

Counterpart Office Action from Divisional U.S. Appl. No. 12/580,644, mailed Oct. 6, 2010, 17 pgs.

\* cited by examiner

<251:Off-line authentication client>

FIG.14

297a, 397a: Logon Authentication Screen A

User Name (U): _____
Logon Target (L): _____

[ OK ]  [ Cancel ]  [ Option (O) << ]

297b, 397b: Logon Authentication Screen B

291, 391: Presentation Pattern

| 2 | 5 | 6 | 6 | 9 | 7 | 7 | 4 | 0 | 7 | 0 | 3 | 3 | 5 | 4 | 8 |
| 4 | 7 | 9 | 6 | 1 | 0 | 2 | 1 | 5 | 5 | 8 | 6 | 6 | 2 | 4 | 8 |
| 0 | 6 | 1 | 1 | 0 | 1 | 1 | 3 | 5 | 6 | 8 | 8 | 2 | 0 | 0 | 7 |
| 5 | 2 | 0 | 5 | 3 | 0 | 0 | 6 | 3 | 3 | 0 | 2 | 1 | 9 | 1 | 4 |

Password(P): _____

[ OK ]  [ Cancel ]

US 7,945,948 B2

SYSTEM, METHOD AND PROGRAM FOR OFF-LINE USER AUTHENTICATION

CROSS-REFERENCE TO RELATED APPLICATIONS

The present patent application claims priority from Japanese Patent Application No. 2006-94782, filed on Mar. 30, 2006.

TECHNICAL FIELD

The present invention relates to a user authentication system, and more specifically to a user authentication system designed to arrange a plurality of pattern elements in a given pattern format so as to create a presentation pattern to be presented to a user subject to authentication, and apply a one-time-password derivation rule serving as a password of the user to certain ones of the pattern elements included in the presentation pattern at specific positions so as to create a one-time password.

BACKGROUND ART

In user authentication systems, a one-time password-based system using a single-use password usable only once for user authentication purpose has become popular as one scheme having higher security than fixed password-based schemes. The one-time password-based system includes a token-based scheme using a token for creating a one-time password in accordance with a one-time-password generation rule synchronous with an authentication server, and a challenge/response scheme designed such that an authentication server transmits to a client a so-called "challenge" which is a value to be varied every time, and the client returns to the authentication server a response created by applying a client's fixed password to the challenge in accordance with a given rule. While the token-based scheme has an advantage of being able to reliably identify a user who owns a token, it forces the user to carry around the token, and has problems about cost of the token and security in the event of loss of the token. In this respect, the challenge/response scheme offers the convenience of being not necessary to use a token. On the other hand, due to a process of generating a one-time password using a client's fixed password which is highly likely to be analogized, the challenge/response scheme involves problems about poor protection against stealing during a password input operation and the need for installing dedicated software to allow a client to generate a response.

In recent years, a new user authentication system has been developed based on a so-called "matrix authentication" scheme to improve the above problems in the conventional challenge/response scheme, (see, for example, the following Patent Publication 1 and Non-Patent Publication 1). This matrix authentication scheme is designed to arrange a plurality of random numbers in a given pattern format so as to create a matrix-form presentation pattern to be presented to a user subject to authentication, and apply a one-time-password derivation rule serving as a password of the user to certain pattern elements (a part of the random numbers) included in the presentation pattern so as to create a one-time password. Specifically, the presentation pattern is shared in common between a server and a client. Then, instead of a direct comparison of password, the sever carries out user authentication by comparing between a one-time password created on the client side as a result of applying the one-time-password derivation rule or the user's password to the presentation pattern, and a verification code created on the server side as a result of applying the one-time-password derivation rule or the user's password to the presentation pattern. In the matrix authentication scheme, a one-time-password derivation rule serving as a password is information about respective positions of certain pattern elements to be selected on a matrix-form presentation pattern and a selection order of the certain pattern elements, and characterized in that it is easily storable in the form of an image and cannot be figured out as a specific password even if being stolen during a password input operation.

FIG. 15 is a block diagram showing an online user authentication system 100 based on a typical conventional matrix authentication scheme. In this conventional matrix authentication scheme, information for creating a presentation pattern 191 is transmitted from an online authentication server 101 to an off-line authentication client 151 in the form of a pattern element sequence 190 (see, for example, the Patent Publication 1). Further, in the conventional matrix authentication scheme, the online authentication server 101 is operable to receive an authentication request from the off-line authentication client 151 of a user subject to authentication and authenticate the user online (see, for example, the Patent Publication 1). Specifically, the online user authentication system 100 generally comprises the online authentication server 101 for carrying out user authentication, and the off-line authentication client 151 serving as a terminal for allowing each user to request authentication. The online authentication server 101 includes a one-time-password-derivation-rule storage section 102, user-ID receiving means 103, pattern generation means 104, pattern transmission means 105, verification-code creation means 106, one-time-password receiving means 107 and user authentication means 108. The off-line authentication client 151 includes user-ID input means 152, user-ID transmission means 153, pattern receiving means 154, pattern display means 155, one-time-password input means 156 and one-time-password transmission means 157.

The off-line authentication client 151 includes user-ID input means 152, user-ID transmission means 153, pattern receiving means 154, pattern display means 155, one-time-password input means 156 and one-time-password transmission means 157.

In the online authentication server 101, the one-time-password-derivation-rule storage section 102 pre-stores respective user IDs 102a and one-time password rules 102b of users in associated relation with each other on a user-by-user basis. The user-ID receiving means 103 is operable to receive the user ID 181 of the user subject to authentication, from the off-line authentication client 151. The pattern generation means 104 is operable, in accordance with a given generation rule, such as a pseudorandom-number generation rule, to generate a pattern element sequence 190 which is a sequence of pattern elements to be included in a matrix-form presentation pattern 191. The pattern transmission means 105 is operable to transmit the generated pattern element sequence 190 to the off-line authentication client 151.

In the off-line authentication client 151, the user-ID input means 152, such as a keyboard, allows the user subject to authentication to enter his/her own user ID 181 therefrom. The user-ID transmission means 153 is operable to transmit the entered user ID 181 to the online authentication server 101. Thus, in the online authentication server 101, the user-ID receiving means 103 receives the transmitted user ID 181. Then, in accordance with the given generation rule, the pattern generation means 104 generates a pattern element sequence 190 or a sequence of random numbers for forming a matrix-form presentation pattern 191. The pattern transmission means 105 transmits the generated pattern element sequence 190 to the off-line authentication client 151. In the off-line authentication client 151, the pattern receiving means 154 is operable to receive the transmitted pattern element sequence 190. The pattern display means 155 is operable to arrange the respective pattern elements included in the received pattern element sequence 190, in a given pattern format 191$p$, so as to create a presentation pattern 191, and display the presentation pattern 191 on a screen.

FIG. 16 is an explanatory conceptual diagram showing a process of creating a presentation pattern 191 in the conventional online user authentication system 100. FIG. 16 shows a presentation pattern 191 as one example in which one-digit numerals of "0 (zero)" to "9" are used as pattern elements, and sixty four of the pattern elements are arranged, respectively, at element positions in a pattern format consisting of four 4×4 matrixes. In this example, the online authentication server 101 is operable to generate, in accordance with a random-number generation algorithm, sixty four of the one-digit numerals which are pattern elements to be included in the presentation pattern 191, and then transmit a pattern element sequence 190 created by sequencing the generated pattern elements, to the off-line authentication client 151. The off-line authentication client 151 is operable to receive the pattern element sequence 190, and arrange the pattern elements included therein, respectively, at element positions on the given pattern format 191$p$ (consisting of four 4×4 matrixes, in this example) in order in conformity to the order in pattern element sequence 190, so as to create the presentation pattern 191, and display the created presentation pattern 191 on the screen.

FIG. 13 is an explanatory conceptual diagram showing a process of entering a one-time password in the matrix authentication scheme. The user selects certain ones of the numerals displayed at given positions on the matrixes in order by applying the one-time-password derivation rule 102$b$ of the user to the presentation pattern 191, and enters the selected numerals as a one-time password from the one-time-password input means 156. Further, a certain number of numerals may be additionally entered without being based on the presentation pattern 191. Specifically, a fixed password of the user may be included in the one-time password. These numerals are entered using a pointing device, such as a mouse or a touch panel, or a keyboard 196. The arrows and circles indicated by broken lines in FIG. 13 show that the one-time password based on the presentation pattern 191 is entered from the key board 196. Then, the one-time-password transmission means 157 is operable to transmit the entered one-time password 192 to the online authentication server 101. In the online authentication server 101, the one-time-password receiving means 107 is operable to receive the transmitted one-time password 192. The verification-code creation means 106 is operable to create a verification code as a result of applying the one-time-password derivation rule 102$b$ associated with the received user ID 181, to certain pattern elements of a presentation pattern formed from the transmitted pattern sequence 190 on the server side. The user authentication means 108 is operable to compare the received one-time password 192 with the created verification code 193, and successfully authenticate the user if they are identical to one another.

[Parent Publication 1] Pamphlet of International Publication WO 03/069490 (lines 2 to 3, page 10)

[Non-Parent Publication 1] Taizu Ohnishi & Associates IT Conference, "Learn from Base Technologies—Mobile Management—", IT SELECT, Mediaselect Inc., Feb. 1, 2002, pp 56 to 60

In the conventional online user authentication system 100, the online authentication server 101 is designed to receive an authentication request from the off-line authentication client 151 of a user subject to authentication and authenticate the user. That is, the conventional online user authentication system 100 is designed to essentially perform user authentication by the authentication server connected to the client via a network, but not to allow the client to perform user authentication by itself. Therefore, the conventional matrix authentication scheme has been utilized on an online basis primarily for authorizing users to use resources on a network, but it has never been utilized on an off-line basis for authorizing users to use resources of a computer itself. On the other hand, there is a strong need for such off-line authentication.

From this standpoint, even if components corresponding to the one-time-password-derivation-rule storage section 102, the pattern generation means 104, the verification-code creation means 106 and the user authentication means 108 are simply shifted from the server to the client, the client cannot perform off-line authentication with reliable security. The reason is that, differently from a usual password, a one-time-password derivation rule 102$b$ serving as a password cannot be hashed using a hash function algorithm when it is stored in the client. Specifically, the process of applying a one-time-password derivation rule 102$b$ to a presentation pattern 191 is necessary to create a verification code 193. However, if a one-time-password derivation rule 102$b$ is hashed and stored, the original one-time-password derivation rule 102$b$ cannot be restored from the hashed one-time-password derivation rule, resulting in failure of creating a verification code 193. Thus, there is the need for an off-line matrix authentication scheme free of the above problem.

DISCLOSURE OF THE INVENTION

In view of the above problem, the present invention provides an off-line user authentication system designed to arrange a plurality of pattern elements in a given pattern format so as to create a presentation pattern to be presented to a user subject to authentication, and apply a one-time-password derivation rule serving as an off-line password of the user to certain ones of the pattern elements included in the presentation pattern at specific positions so as to create a one-time password. The off-line user authentication system comprises an off-line authentication support server and an off-line authentication client. In the off-line authentication support server, a plurality of pattern element sequences each consisting of a set of pattern elements for forming a presentation pattern are generated in accordance with a given generation rule, and a plurality of verification codes are created by applying the one-time-password derivation rule of the user to the respective presentation patterns formed from the plurality of generated pattern element sequences and then subjecting the respective obtained results to a one-way function algorithm. The plurality of generated pattern element sequences and the plurality of created pattern element sequences are transmitted to the off-line authentication client. Then, in the off-line authentication client, one of the plurality of received pattern element sequences is selected to create a presentation pattern, and the created presentation pattern is displayed. A result of subjecting a one-time password entered based on the displayed presentation pattern to the one-way function algorithm is compared with a corresponding one of the verification codes to perform user authentication.

In the off-line user authentication system of the present invention, the off-line authentication client may be designed to receive a plurality of pattern seed values each adapted to be combined with the entered user ID so as to define the corresponding pattern element sequences, from off-line authentication support server, in place of the plurality of pattern element sequences.

In the off-line user authentication system of the present invention, the off-line authentication client may be designed to select one of the remaining pattern element sequences or pattern seed values except for one which has already been used once therein.

In the off-line user authentication system of the present invention, the off-line authentication support server may be designed to be activated just after the off-line authentication client is set to an on-line state as a result of a successful user authentication procedure for a connection to the network between the off-line authentication support server and the off-line authentication client by use of the user ID.

In the off-line user authentication system of the present invention, the one-time-password derivation rule may consist of a combination of respective positions of certain ones to be selected from the pattern elements included in the presentation pattern and a selection order of the certain pattern elements. Alternatively, the one-time-password derivation rule may consist of a combination of: respective positions of certain ones to be selected from the pattern elements included in the presentation pattern; one or more characters to be entered without being based on the presentation pattern; and a selection or input order of the certain pattern elements and the characters.

In the off-line user authentication system of the present invention, the pattern elements to be included in the presentation pattern may be selected from ten numerals of 0 (zero) to 9 and a symbol, or may be selected from ten numerals of 0 (zero) to 9.

In the off-line user authentication system of the present invention, the given pattern format for use in arranging the plurality of pattern elements to create the presentation pattern may include a matrix having a number m of matrix elements in height and a number n of matrix elements in width to form a rectangular shape in its entirety.

In the inventions described above or set forth in appended claims, each of the terms "server" and "client" is not intended to express a device, apparatus or system having a typical function. Further, a function of a single component or claim-element may be achieved by two or more physical means, and a function of two or more components or claim-elements may be achieved by a single physical means. In the appended claims, a system claim may be recognized as a method or process claim defined such that respective functions of claim elements in the system claim are sequentially executed, and the opposite is true. It is understood that the steps defined in the method claim are not necessarily executed in order of description but may be executed in any suitable order allowing an intended function to be achieved in their entirety. The system and method of the present invention may be designed using a program capable of partly or entirely achieving the intended function in cooperation with given hardware, or a recording medium having the program recorded thereon.

As above, the user authentication system of the present invention is designed to present a presentation pattern to a user subject to authentication, and apply a one-time-password derivation rule serving as a password of the user to certain pattern elements included in the presentation pattern at specific positions so as to create a one-time password. A plurality of pattern element sequences for forming presentation patterns and a plurality of verification codes created by applying the one-time-password derivation rule to the respective presentation patterns and then subjecting the respective obtained results to a one-way function algorithm are stored in the off-line authentication client. Then, one of the stored pattern element sequences is selected to create a presentation pattern, and a result of subjecting a one-time password entered based on the presentation pattern to the one-way function algorithm is compared with a corresponding one of the verification codes to perform user authentication. Thus, the off-line authentication client can display or present a presentation pattern by itself. In addition, the password itself is not stored in the off-line authentication client, and the verification codes for verifying the password is hashed. This provides an effect of being able to achieve an off-line matrix authentication scheme having high security capable of preventing password leakage even if a client PC is analyzed. Further, the off-line user authentication system of the present invention can be designed to select one of the remaining pattern element sequences or pattern seed values except for one which has already been used once for user authentication. This provides an effect of being able to ensure high security against brute-force attack.

The off-line user authentication system of the present invention can be designed to create/display a presentation pattern based on the entered user ID and the stored pattern seed value and in accordance with a given pattern-element-sequence creation rule. Thus, even if the pattern seed value and the pattern-element-sequence creation rule is leaked to a malicious third party through analysis of a client PC, a presentation pattern cannot be created unless the user ID is known. This provides an effect of being able to ensure high security.

The off-line user authentication system of the present invention can be designed to activate the off-line authentication support server just after the off-line authentication client is set to an on-line state as a result of a successful user authentication procedure for a connection to the network between the off-line authentication support server and the off-line authentication client by use of the user ID. This provides an effect of being able to perform respective logon authentications in online and off-line states in a seamless manner and automatically transmit verification data for off-line authentication, to a proper network user.

BRIEF DESCRIPTION OF DRAWINGS

FIG. 14 is a schematic diagram showing an image on a Windows® logon authentication screen in the off-line user authentication systems 200, 300 according to the first and second embodiments.

BEST MODE FOR CARRYING OUT THE INVENTION

Figure 1:
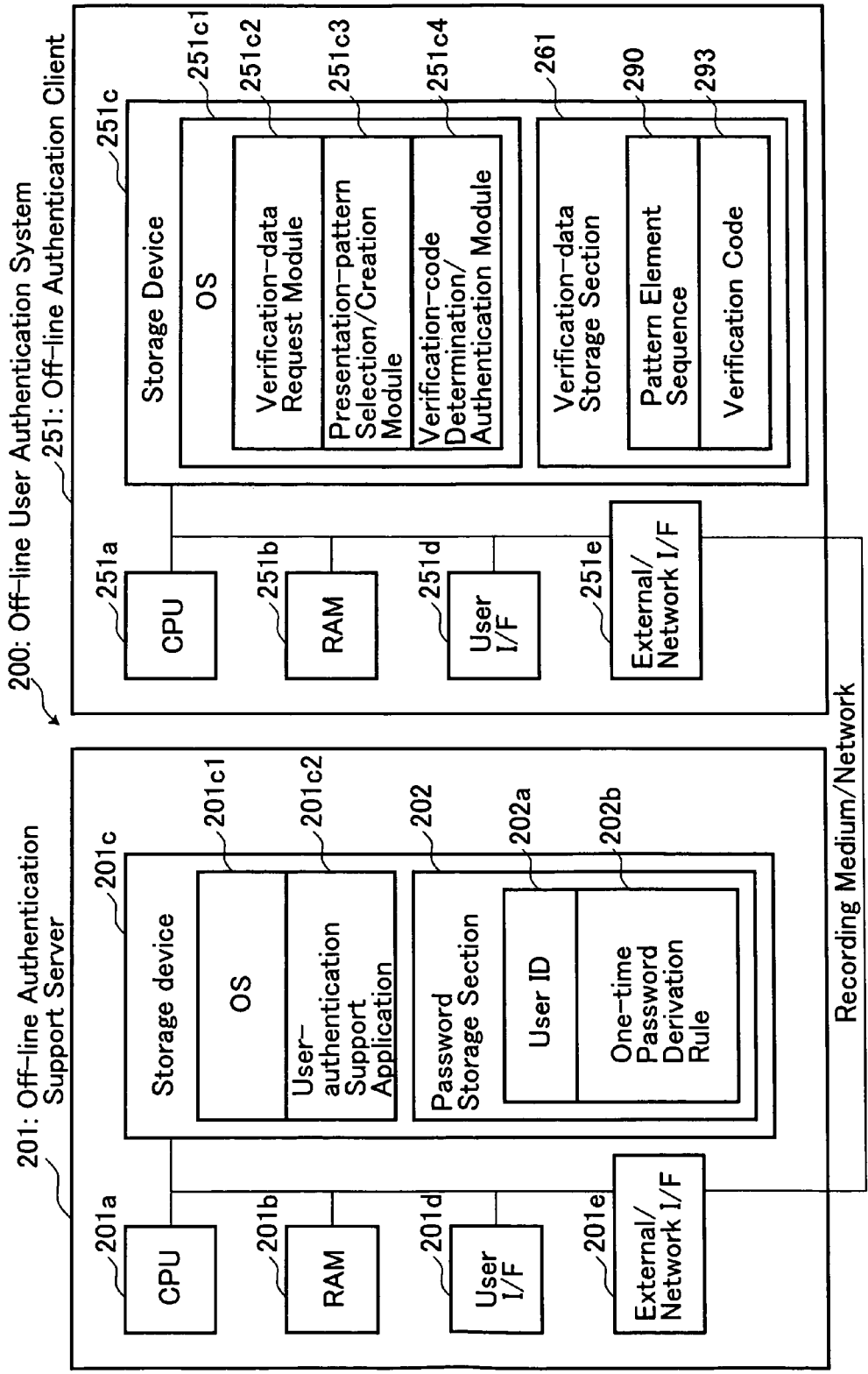
FIG. 1 is a block diagram showing a hardware configuration of an off-line user authentication system 200 according to a first embodiment of the present invention.

The present invention will now be specifically described. In the present invention, information allowing for creating a plurality of different presentation patterns and a plurality of verification codes corresponding to the respective presentation patterns are stored in a client. Based on these data, the client displays one of the presentation patterns to prompt a user to enter a one-time password. Then, a result of subjecting the one-time password to a one-way function algorithm is compared with the corresponding verification code to authenticate the user. As a preferred embodiment of the present invention, first and second embodiments will be disclosed in this specification. As to the information to be stored in the client and used for creating a plurality of presentation patterns, the first embodiment of the present invention employs a plurality of pattern element sequences each adapted to form a presentation pattern, and the second embodiment of the present invention employs a plurality of pattern seed values each adapted to be combined with a user ID entered in the client (hereinafter referred to as "request-user ID") so as allow a presentation pattern to be created. In an off-line user authentication system 200 according to the first embodiment, the plurality of pattern element sequences 290 each adapted to form a presentation pattern 291 are stored in an off-line authentication client 251. In an off-line user authentication system 300 according to the second embodiment, the plurality of pattern seed values 391 each adapted to be combined with a request-user ID 381 so as allow a presentation pattern 391 to be formed are stored in an off-line authentication client 351. The following description will be made firstly about an outline of a user authentication process of the present invention which is common in the first and second embodiments, and then about the details of the first and second embodiments.

As used in the specification, the term "online" means a state when a user is connected as an authorized or proper network user to the same network as an off-line authentication support server (201, 301) by use of the off-line authentication client (251, 351). In cases where a user uses the off-line authentication client (251, 351) in an online state, it is necessary to establish a scheme to allow the user to use a resource of the network only after permission thereof. For example, in a network managed based on a domain configuration, it is necessary to establish a scheme to allow a user to logon to the domain (management) network only after obtaining authentication. The term "off-line" means a state when, while a user uses the off-line authentication client (251, 351) as a proper network user, the user or the off-line authentication client (251, 351) is not connected to the same network as an off-line authentication support server (201, 301). Even in the off-line state, it is possible to logon to a Windows® network as a domain network user or a local computer user. Thus, it is necessary to establish a scheme to allow a user to use the off-line authentication client (251, 351) in the off-line state only after obtaining authentication for authorizing the user to logon to the domain network or associated computers.

[User Authentication Process of the Present Invention]

Figure 2:
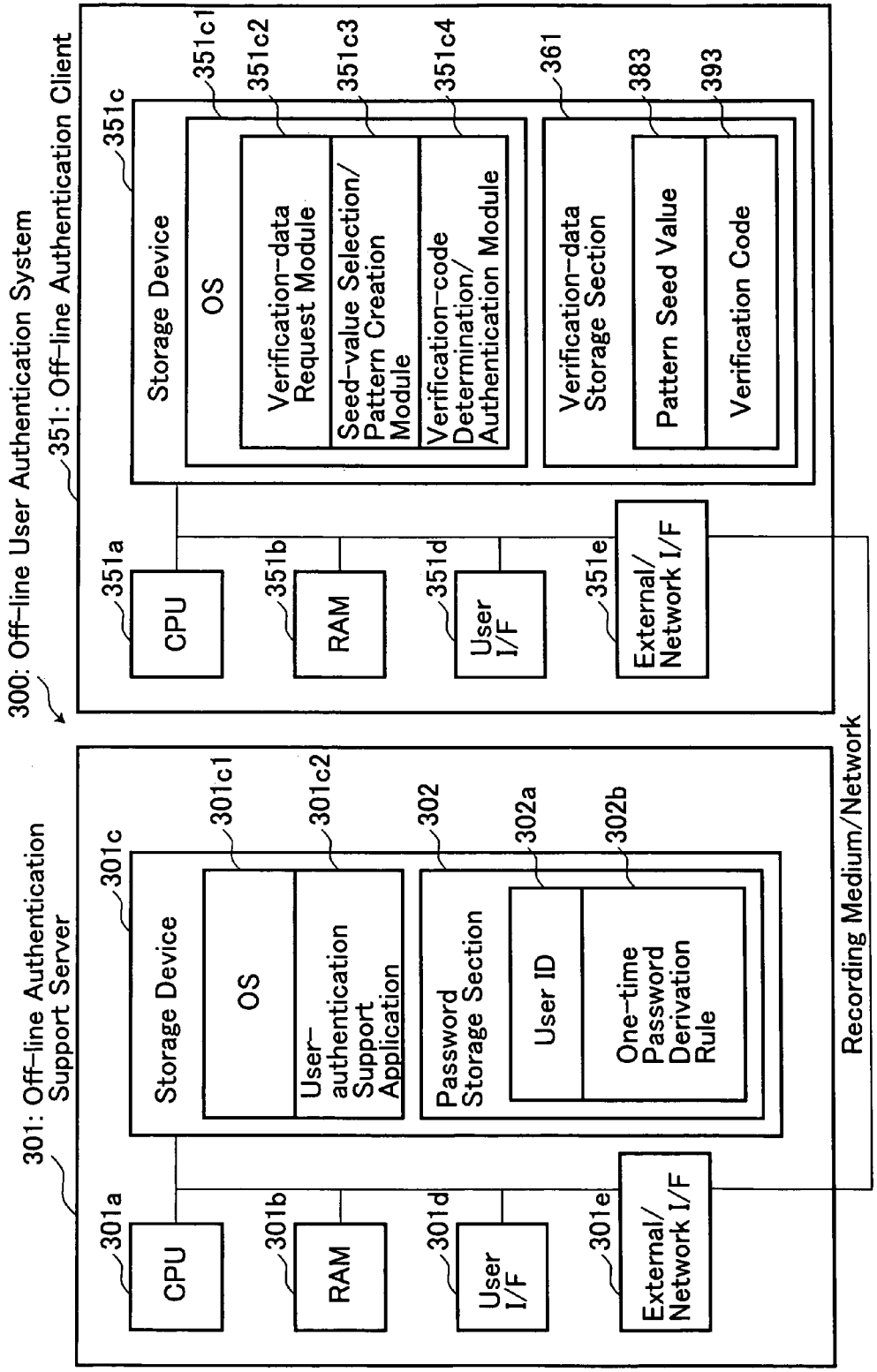
FIG. 2 is a block diagram showing a hardware configuration of an off-line user authentication system 300 according to a second embodiment of the present invention.
Figure 3:
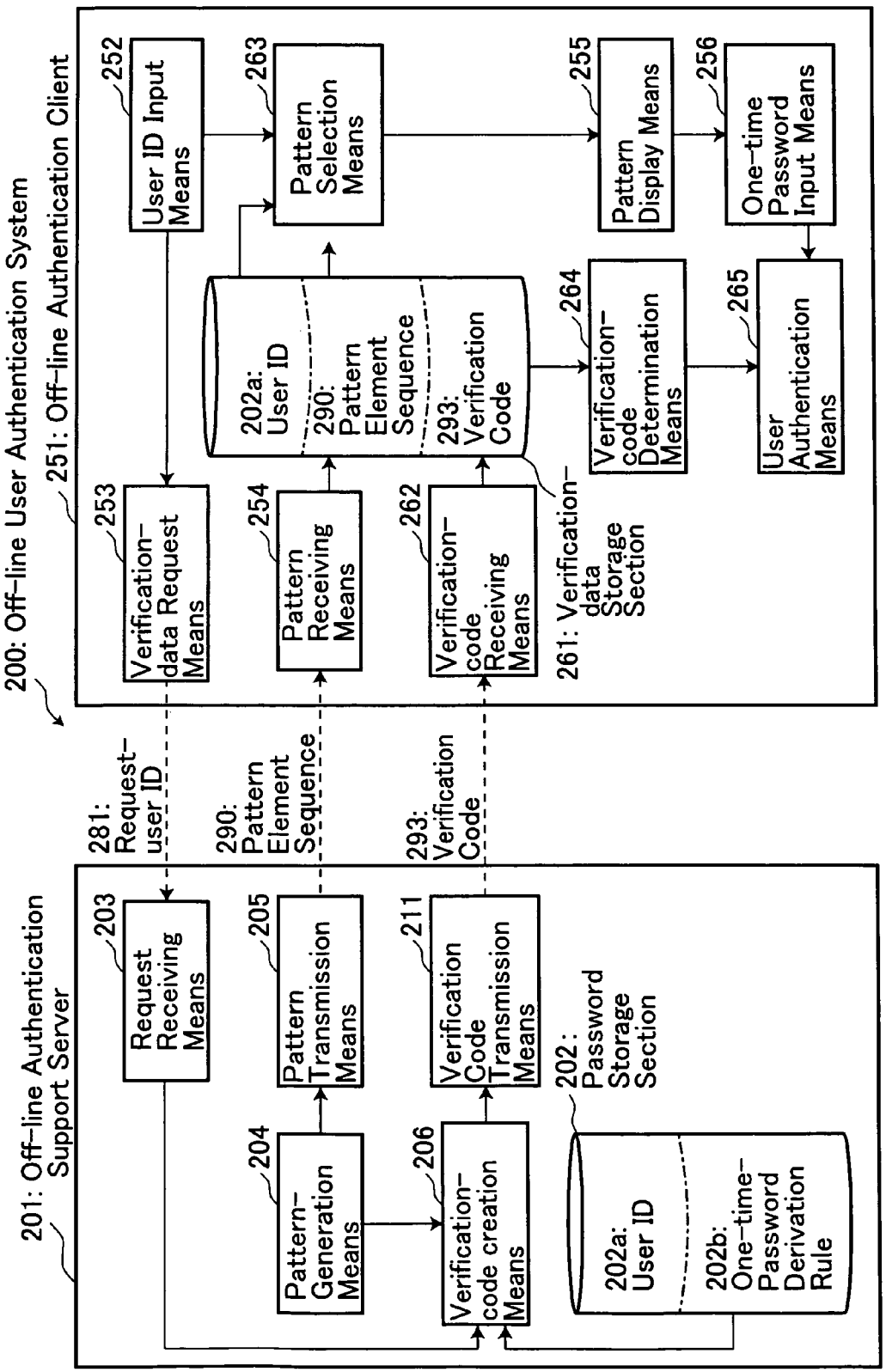
FIG. 3 is a functional block diagram showing the off-line user authentication system 200 according to the first embodiment.
Figure 4:
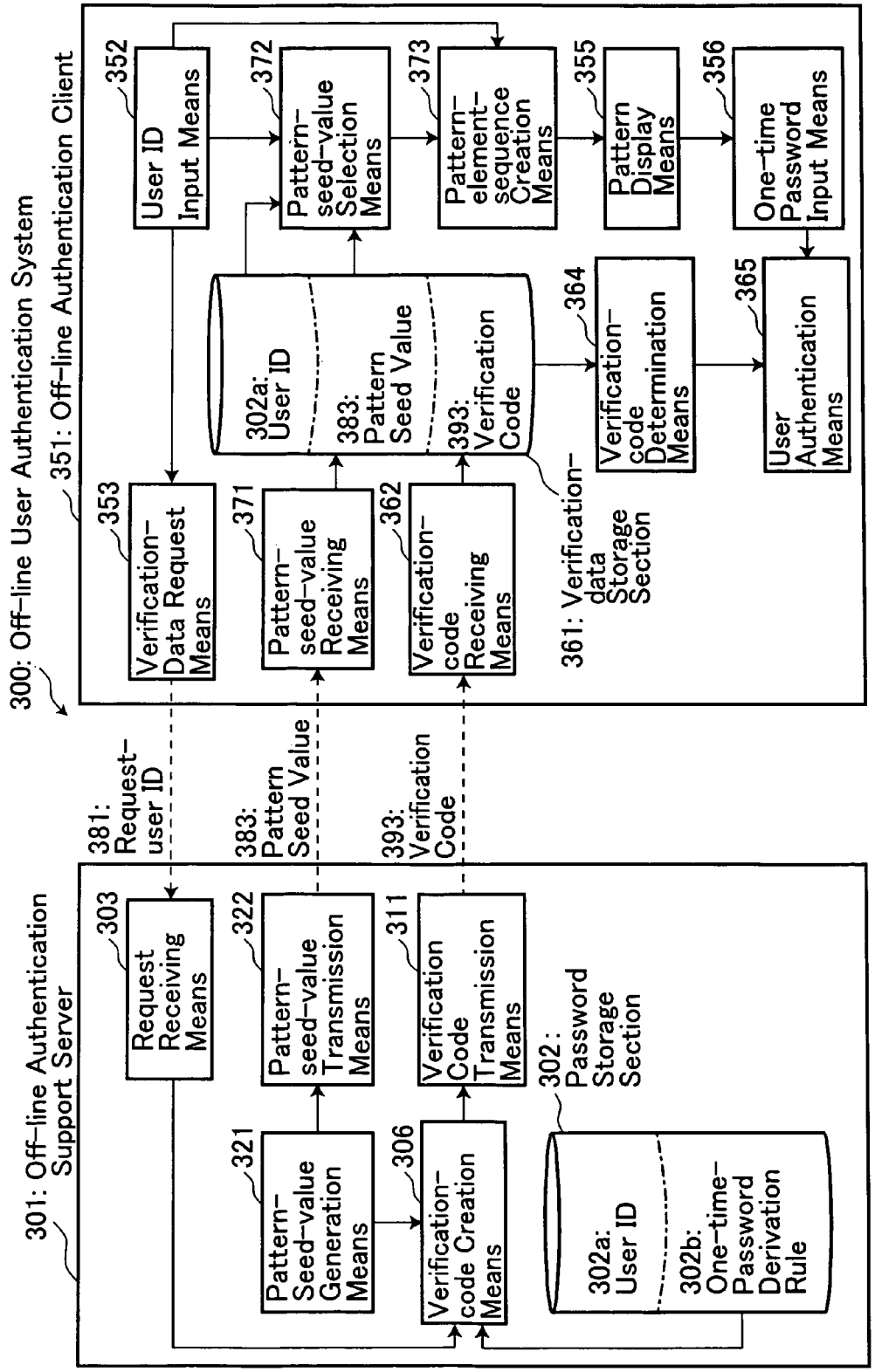
FIG. 4 is a functional block diagram showing the off-line user authentication system 300 according to the second embodiment.

With reference to the drawings, a user authentication process of the present invention will be described below. In the figures, a component or element of the off-line user authentication systems 200, 300 corresponding to that of the aforementioned conventional user authentication system 100 is defined by a reference numeral having the same lower two digits. FIGS. 1 and 2 are block diagrams showing respective hardware configurations of the off-line user authentication systems 200, 300, and FIGS. 3 and 4 are respective functional block diagrams of the off-line user authentication system 200, 300. FIGS. 5 to 8 are flowcharts showing respective operations of the off-line user authentication system 200, 300. Firstly, an outline of a user authentication process of the present invention will be described below. The user authentication process of the present invention is based on the aforementioned matrix authentication scheme which is one type of challenge/response authentication schemes. In the user authentication process of the present invention, as a common point between the first and second embodiments, the off-line authentication client (251, 351) is operable to arrange a plurality of pattern elements in a given pattern format so as to create a presentation pattern (291, 391) to be presented to a user subject to authentication, and the user applies a one-time-password derivation rule (202b, 302b) serving as a password of the user to certain ones of the pattern elements included in the presentation pattern (291, 391) so as to create a one-time password (292, 392).

In the first embodiment, a plurality of pattern element sequences 290 or information for use in creating a presentation pattern 291 to be presented to a user in the off-line authentication client 251 is pre-created in the off-line authentication support server 201, and transmitted to the off-line authentication client 251 via a network or a recording medium. Then, the transmitted pattern element sequences 290 are stored in the off-line authentication client 251. A plurality of verification codes 293 for use in verifying whether a one-time password 292 entered into the off-line authentication client 251 is valid are pre-created in the off-line authentication support server 201 by applying a one-time-password derivation rule 202b serving as a pass word of the user to respective presentation patterns 291 formed from the pattern element sequences 290, and subjecting the respective obtained results to a one-way function algorithm. Then, the created verification codes 293 are transmitted to the off-line authentication client 251 via a network or a recording medium, and stored in the off-line authentication client 251.

In the second embodiment, a plurality of pattern seed values 383 or information for use in creating a presentation pattern 391 to be presented to a user in the off-line authentication client 351 is pre-created in the off-line authentication support server 301, and transmitted to the off-line authentication client 351 via a network or a recording medium. Then, the transmitted pattern seed values 383 are stored in the off-line authentication client 351. The presentation pattern 391 is created based on one of the pattern seed value 383 and an entered user ID and in accordance with a given generation rule. A plurality of verification codes 393 for use in verifying whether a one-time password 392 entered into the off-line authentication client 351 is valid are pre-created in the off-line authentication support server 301 by applying a one-time-password derivation rule 302b serving as a pass word of the user to respective presentation patterns 391 formed from a plurality of pattern element sequences 390 based on the pattern seed values 383 and an input user ID and subjecting the respective obtained results to a one-way function algorithm. Then, the created verification codes 393 are transmitted to the off-line authentication client 351 via a network or a recording medium, and stored in the off-line authentication client 351.

Then, as a common point between the first and second embodiments, in the off-line authentication client (251, 351), one of precursors creatable as a plurality of presentation patterns (291, 391) is selected, and one of the presentation patterns (291, 391) is created and displayed. The user applies his/her one-time-password derivation rule to the displayed presentation pattern (291, 391) and enters a created one-time password (292, 392). The off-line authentication client (251, 351) compares a result of subjecting the entered one-time password (292, 392) to the same one-way function algorithm as that used for creating the verification codes (293, 393), with a corresponding one of the verification codes (293, 393), and successfully authenticates the user if they are identical to one another.

The terms used in this specification will be described below.

[Terms: Presentation Pattern and Pattern Elements]

The term "presentation pattern" means a set of pattern elements arranged in a given pattern format. While the given pattern format is typically a matrix having a number m of matrix elements in height and a number n of matrix elements in width to form a rectangular shape in its entirety, or a plurality of the matrixes, it may be any other suitable pattern. In this specification, an authentication scheme using a presentation pattern arranged in a pattern format other than the typical matrix pattern will also be referred to as "matrix authentication scheme". Preferably, the give pattern format is formed as an orderly pattern or an impressive pattern easily remaining in user's memory to allow a user to easily remember the one-time-password derivation rule (202b, 302b) serving as a password of the user.

The term "pattern element" means an element to be arranged at a given position in the given patter format so as to constitute a presentation pattern. Preferably, the pattern element is selected from one-digit numerals of "0 (zero)" to "9". Alternatively, the pattern element may be any other suitable character, such as alphabet or symbol. In particular, the symbol is preferably "+", "−", "*", "=", "_", "!", "?", "#", "$" or "&" which is assigned to a keyboard for a personal computer (PC). The character may include a figure, such as graphic, illustration or photograph. Preferably, a plurality of the same pattern elements are used in a single presentation pattern. In this case, there is a many-to-one correspondence between a one-time-password derivation rule (202b, 302b) serving as a password of a user and a one-time password (292, 392) created as a result of applying the one-time-password derivation rule (202b, 302b) to a presentation pattern (291, 391), and therefore a one-way encryption operation is automatically performed during input of the one-time password (292, 392). Thus, even if the presentation pattern (291, 391) has already been specified, the one-time-password derivation rule (202b, 302b) cannot be specified based on only a single one-time password (292, 392).

Figure 13:
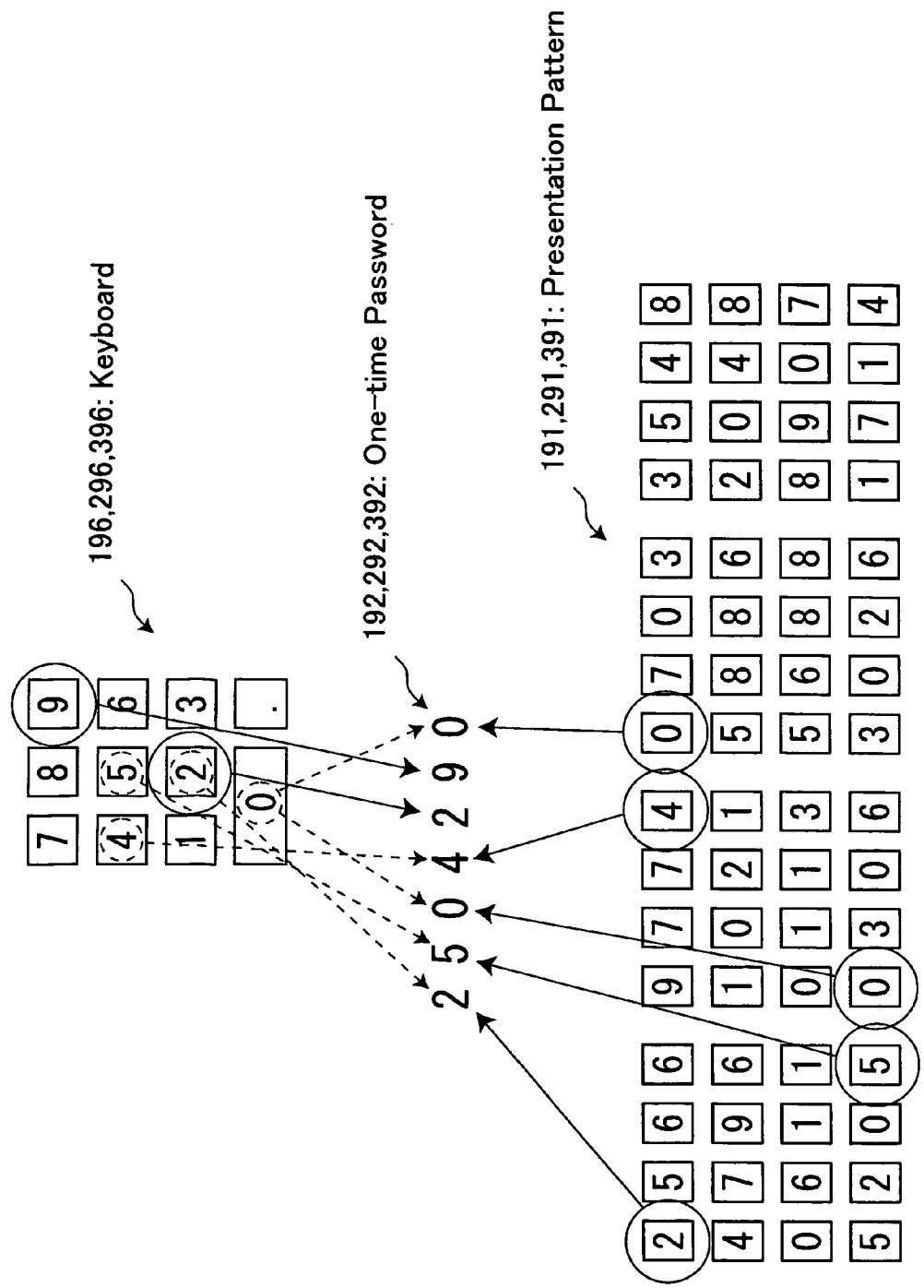
FIG. 13 is an explanatory conceptual diagram showing a process of entering a one-time password in the matrix authentication scheme.
Figure 15:
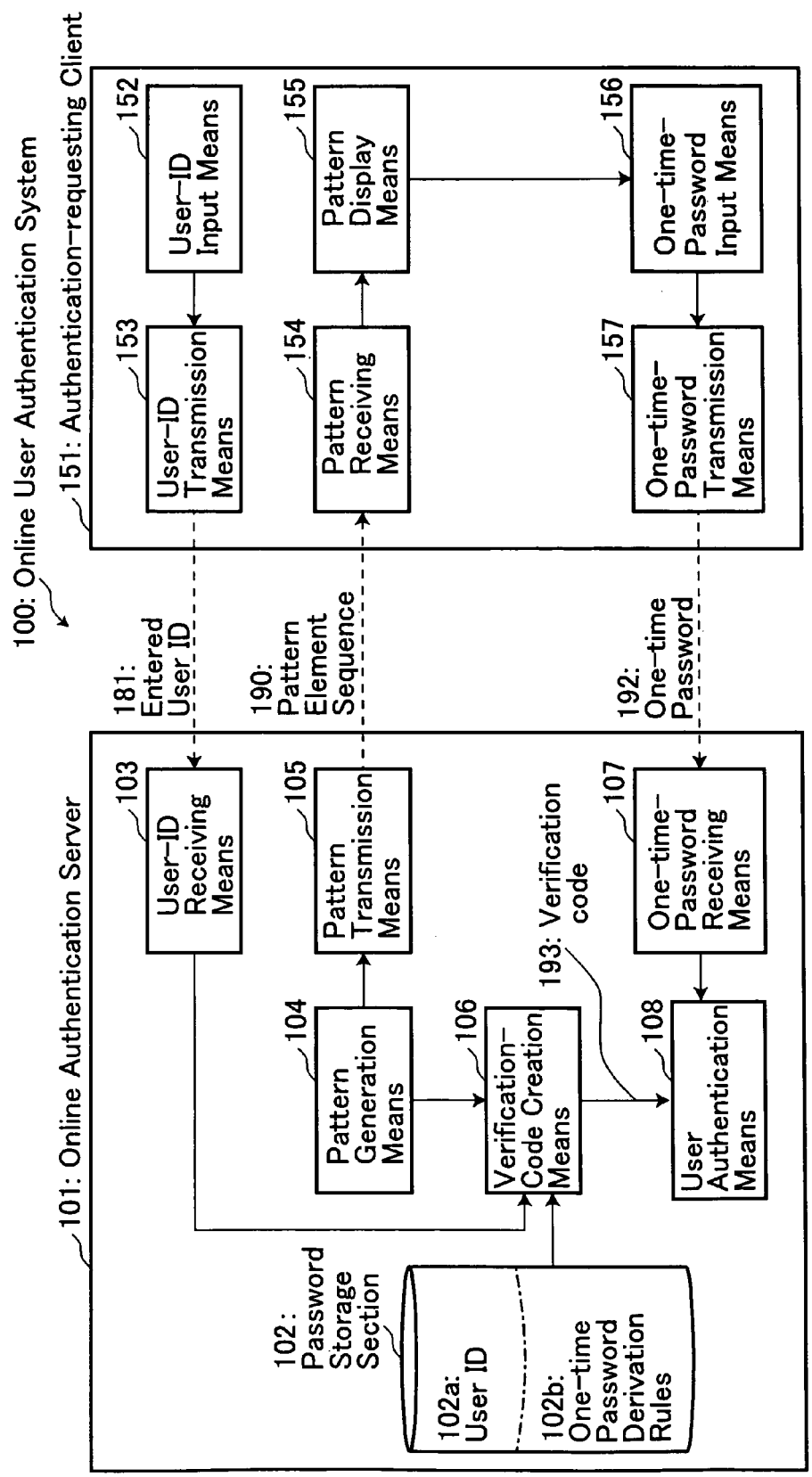
FIG. 15 is a block diagram showing an online user authentication system 100 based on a conventional matrix authentication scheme.
Figure 16:
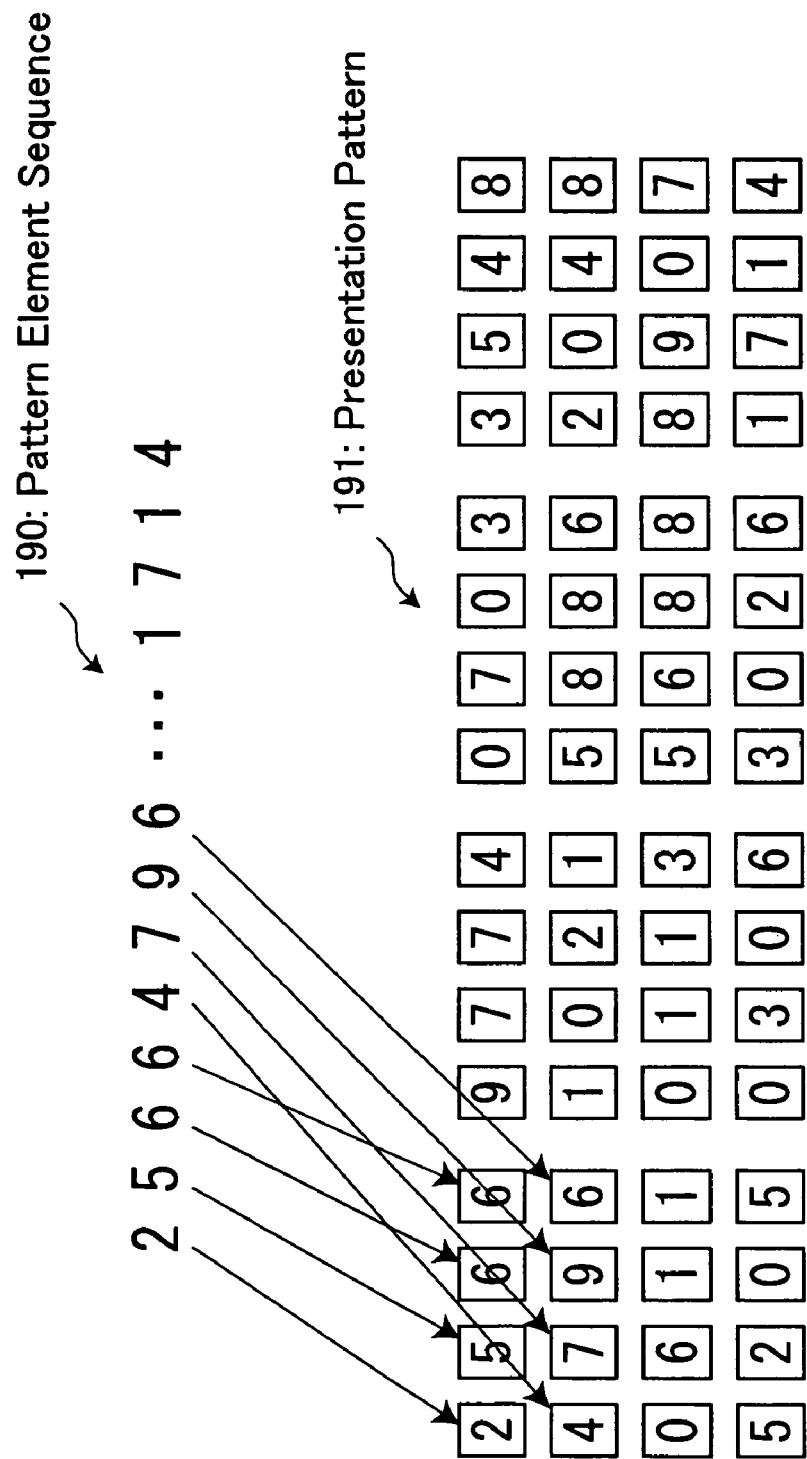
FIG. 16 is an explanatory conceptual diagram showing a process of creating a presentation pattern in the online user authentication system 100 based on the conventional matrix authentication scheme.

In this embodiment, as shown in FIG. 13, one-digit numerals of "0 (zero)" to "9" are used as pattern elements, and a presentation pattern (291, 391) is formed of sixty four of the pattern elements arranged in a given pattern format (291p, 391p) consisting of four 4×4 matrixes. In a off-line authentication client having a display screen with a small area, such as a portable phone, a presentation pattern may be formed using a reduced number (e.g. three) of 4×4 matrixes.

[Term: Pattern Element Sequence]

A pattern element sequence (290, 390) is data representing the content of a plurality of pattern elements to be arranged in the given pattern format (291p, 391p) so as to create a presentation pattern (291, 391). Typically, the pattern element sequence (290, 390) is formed by arranging all pattern elements in order to be included in the presentation pattern (291, 391). The pattern element sequence (290, 390) is created in advance of the creation of the presentation pattern (291, 391). It should be noted that a pattern element sequence (290, 390) is not necessarily a single character sequence formed by arranging a plurality of pattern elements in order, but means data including information about all pattern elements to be included in a single presentation pattern (291, 391). That is, as long as a plurality of pattern elements included in a pattern element sequence (290, 390) are arranged therein in association, respectively, with positions in a presentation pattern (291, 391), the order of the pattern elements included in the pattern element sequence (290, 390) may be freely determined. Further, the pattern element sequence (290, 390) may be divided into a plurality of data.

Term: Pattern Element Sequence in First Embodiment

In the off-line user authentication system 200 according to the first embodiment, a plurality of pattern element sequences 290 are created in the off-line authentication support server 201, and transmitted to the off-line authentication client 251 via a network or a recording medium, such as a USB memory or a floppy® disk. Then, the transmitted pattern element sequences 290 are stored in the off-line authentication client 251.

Term: Pattern Element Sequence in Second Embodiment

In the off-line user authentication system 300 according to the second embodiment, a pattern element sequence 390 is created in the off-line authentication client 251, and used only for creating a presentation pattern 391 in the off-line authentication client 251 without being transmitted to the off-line authentication support server 301 via a network. In contrast, a pattern element sequence 190 in the conventional user authentication system 100 is generated in the authentication server 101, and then transmitted from the authentication server 101 to the off-line authentication client 151 via a network.

[Term: One-Time-Password Derivation Rule]

A one-time-password derivation rule (202b, 302b) is a rule to be applied to certain pattern elements included in a presentation pattern (291, 391) at specific positions so as to create a one-time password (292, 392), and is data serving as a password of a user. The "rule to be applied to certain pattern elements" means a rule for selecting certain pattern elements at specific positions in a specific order. In these embodiments, a one-time-password derivation rule (202b, 302b) is information consisting of a combination of respective positions of certain ones to be selected from a plurality of pattern elements included in a presentation pattern (291, 391), and a selection order of the certain pattern elements. The one-time-password derivation rule (202b, 302b) may include character information, such as numeral, to be entered without being based on the presentation pattern (291, 391). In this case, the one-time-password derivation rule (202b, 302b) is information consisting of a combination of: respective positions of certain ones to be selected from the pattern elements included in the presentation pattern (291, 391); one or more characters to be entered without being based on the presentation patter (291, 391); and a selection or input order of the certain pattern elements and the characters. That is, a fixed password element which is not based on the presentation patter (291, 391) may be included in a one-time password.

Figure 12:
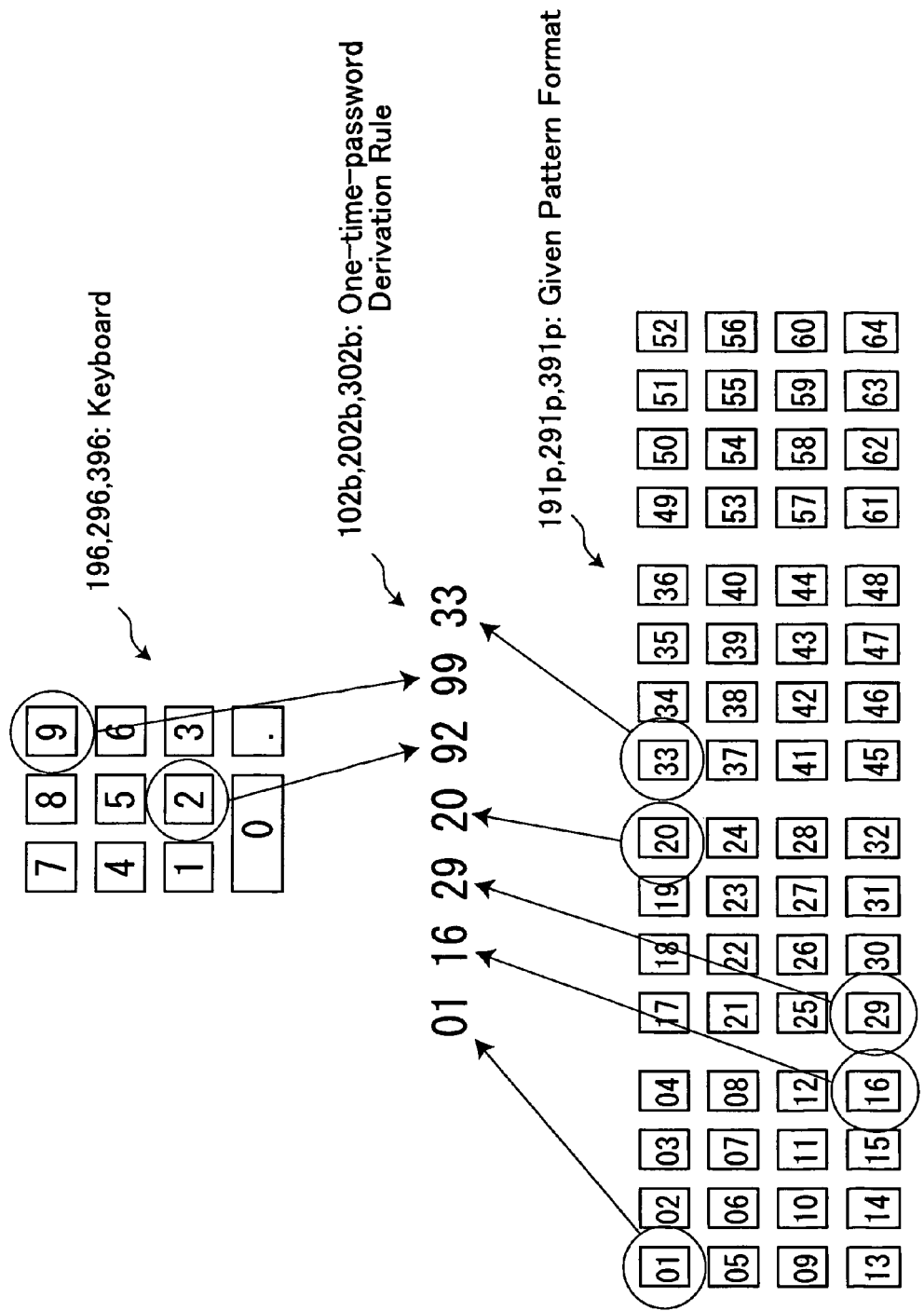
FIG. 12 is an explanatory conceptual diagram showing a one-time-password derivation rule in a matrix authentication scheme.

FIG. 12 shows the configuration of a one-time password created according to a typical one-time-password derivation rule (202b, 302b). In these embodiments, the one-time-password derivation rule (202b, 302b) is applied to a presentation pattern (291, 391) formed by arranging a plurality of pattern elements using one-digit numerals of "0 (zero)" to "9", in the given pattern format (291p, 391p) consisting of four 4×4 matrixes. In FIG. 12, respective positions of the pattern elements in the given pattern format (291p, 391p) are distinctively indicated by sixty four numerals of 01 to 64. When the presentation pattern (291, 391) is presented to a user subject to authentication, either one of the one-digit numerals of "0" to "9" will be displayed at each of the positions of the pattern elements in the given pattern format (291p, 391p).

Preferably, in addition to numerals entered based on the presentation pattern (291, 391), one or more numerals are entered without being based on the presentation pattern (291, 391) to create a one-time password (292, 392). The number of pattern elements included in the presentation pattern (291, 391) is sixty four. Thus, each one selected from the sixty four pattern elements included in the presentation pattern (291, 391) is indicated by a corresponding one of the two-digit numeral of 01 to 64 assigned, respectively, to the sixty four pattern elements. Further, each of the numerals to be entered without being based on the presentation pattern (291, 391) is indicated by a two-digit numeral in which "9" is assigned as the initial digit to represent the above feature of the numeral, and one-digit numeral to be entered is assigned as the last digit. As shown in FIG. 12, certain ones selected from the pattern elements of the presentation pattern (291, 391) at specific positions are entered as the first four numerals of the one-time password (292, 392). The numerals "01", "16", "29", "20" representing the respective positions of the pattern elements selected according to the one-time-password derivation rule (202b, 302) are arranged in this order as a corresponding part of the one-time password. The selected pattern elements are entered using a keyboard (296, 396) or a pointing device. The subsequent two numerals of the one-time password (292, 392) are entered without being based on the presentation pattern (291, 391) as a fixed password element, using the key board (296, 396) or the like. The numerals "92", "99" each having the numeral "9" representing the direct input and the entered numeral "2" or "9" added thereto according to the one-time-password derivation rule (202b, 302b) are subsequently arranged in this order as a corresponding part of the one-time password. Then, certain one selected from the pattern elements of the presentation pattern (291, 391) at a specific position is entered as the subsequent last one numeral of the one-time password (292, 392). The numeral "33" representing the position of the pattern element selected according to the one-time-password derivation rule (202b, 302) is subsequently arranged as a corresponding part of the one-time password, and the one-time password is terminated. The one-time-password derivation rule (202b, 302b) may be designed to further add an end mark uniquely specifying the termination point of the one-time password, such as a numeral "00", to the tail end of the one-time password, or to associate a numerical value representing the entire length of the one-time password, with the one-time password.

[Term: Pattern Seed Value]

A pattern seed value 383 is used only in the second embodiment. A pattern seed value 383 is adapted to be combined with a request-user ID 381 so as to uniquely determine pattern elements to be included in a single presentation pattern 391, and is a constant generated in accordance with a given generation rule to fall within a given range. In order to present or display a presentation pattern 391, the off-line authentication client 351 is required to store information for creating the presentation pattern 391. In the first embodiment, the off-line authentication client 251 stores the pattern element sequences 290 for forming respective presentation patterns 291. In this case, if the off-line authentication client 251 is analyzed by a malicious third party, the pattern element sequence 290 will be specified, and thereby the presentation pattern 291 is likely to be specified. This is undesirable in terms of security. As measures against this risk, it is contemplated to avoid storing the pattern element sequences 290. However, the off-line authentication client 351 can perform authentication only if the presentation pattern 391 is created and displayed.

In order to meet such contradictory requirements, it is contemplated to store in the off-line authentication client 351 presentation-pattern specifying information which is able to uniquely determine a presentation pattern 391 but not formed as a pattern element sequence 390 itself. Then, the off-line authentication client 351 will create the presentation pattern 391 based on the stored presentation-pattern specifying information and in accordance with a given rule. For example, a hash function algorithm may be used as the given rule. In this case, a pattern element sequence 290 itself is not stored to provide enhanced security. However, even in this scheme, if an algorithm installed on the off-line authentication client 351 to create the presentation pattern 391 from the presentation-pattern specifying information is analyzed by a malicious third party, and the presentation-pattern specifying information is analyzed by the malicious third party, the analyzed information will bring about the possibility of create the presentation pattern 391 based thereon. Therefore, the user authentication system using the above presentation-pattern specifying information is not enough in terms of security.

In the second embodiment, in stead of storing a pattern element sequence 391 itself, a plurality of pattern seed values 383 are stored in the off-line authentication client 351. Each of the pattern seed values 383 is adapted to be combined with a request-user ID 381 entered by a user in the off-line authentication client 351, so as to allow a presentation pattern 391 to be uniquely determined. That is, while the pattern seed value 383 cannot uniquely determine the presentation pattern 391 by itself, it can be combined with the request-user ID 381 essentially entered by the user in the off-line authentication client 351, to uniquely determine the presentation pattern 391. Thus, even if the pattern seed value 383 is analyzed by a malicious third party, it is impossible to estimate the presentation pattern 391 based thereon, because the pattern seed value 383 does not represent the presentation pattern 391 itself. In addition, even if an algorithm for creating the presentation pattern 391 is analyzed based on the request-user ID 381 and the pattern seed value 383, it is impossible to estimate the presentation pattern 391 unless the request-user ID 381 is known. The second embodiment employing the above scheme can make it significantly difficult to analyze a presentation pattern 391 to be presented in the off-line authentication client 351, and thereby can provide enhanced security.

Typically, a pattern seed value 383 is a numerical value generated in accordance with a random-number generation algorithm to fall within a given range. Instead of the random-number generation algorithm, the pattern seed value 383 may be generated in accordance with any other suitable operation for generating a numerical value within the given range, such as a count-up or count-down operation for sequentially adding or subtracting a given value to or from a given initial value.

[Term: One-Time Password]

A one-time password (292, 392) is a single-use password to be created/entered by a user subject to authentication through an operation of applying a one-time-password derivation rule (202$b$, 302$b$) of the user to a presentation pattern (291, 391). FIG. 13 is an explanatory conceptual diagram showing a process of entering a one-time password in the matrix authentication scheme. A one-time-password derivation rule (202$b$, 302$b$) used in FIG. 13 is the same as that shown in FIG. 12. The user selects certain ones of a plurality of pattern elements included in a presentation pattern (291, 391) at given positions and enters one or more given numerals without being based on the presentation pattern (291, 391), in a given order according to the one-time-password derivation rule (202$b$, 302$b$) of the user, to create/enter "2504290" as a one-time password (292, 392).

[Term: Verification Code]

A verification code (293, 393) is data for verifying correctness of an entered one-time password (292, 392). A plurality of verification codes (293, 393) are created by applying a one-time-password derivation rule (202$b$, 302$b$) of a user to respective sets of pattern elements (certain pattern elements at specific positions) included in a plurality of presentation patterns (291, 391) created based on the plurality of pattern element sequences 290 or the plurality of pattern seed values 383 stored in the off-line authentication client (251, 351), and subjecting the respective obtained results to a one-way function algorithm. That is, each of the verification codes (293, 393) is created by subjecting to a one-way function algorithm a value identical to that of a proper one-time password (292, 392) created as a result of applying a proper one-time-password derivation rule (202$b$, 302) associated with a user subject to authentication to a proper presentation pattern (291, 391). Thus, the verification codes (293, 393) are created in the same number as that of creatable or displayable presentation patterns (291, 391), and pre-stored in the off-line authentication client (251, 351). When the off-line authentication client (251, 351) performs user authentication, a value obtained by subjecting an entered one-time password (292, 392) to the same one-way function algorithm as that used for creating the verification codes (293, 393) is compared with one of the verification codes (293, 393) corresponding to a presented presentation pattern (291, 391) to verify correctness of the entered one-time password (292, 392). It is understood that, even if the verification code (293, 393) is not hashed, correctness of the entered one-time password (292, 392) can be verified. In this case, the non-hashed verification code is identical to the original or proper verification code (293, 393). Thus, if the client PC is analyzed by a malicious third party, plural pairs of the presentation pattern (291, 391) and the proper one-time password (292, 392) will become known, or the one-time-password derivation rule (202$b$, 302$b$) as a password will be undesirably specified. In contrast, the hashed verification code (293, 393) makes it impossible to specify the proper one-time-password derivation rule (202$b$, 302$b$) based thereon. Thus, even if the client PC is analyzed by a malicious third party, the one-time-password derivation rule (202$b$, 302$b$) as a password will never be leaked.

[Term: One-Way Function and Hash Function]

A "one-way function" means a function providing the following relation: while an output value applied to a certain input value can be easily calculated, the original input value is hardly calculated from the output value. A hash function means a function having a collision resistance such that if an original input value varies, a probability of creation of identical output values becomes extremely low, in addition to a one-way encryption property as a basic feature of a one-way function and additionally. Typically, the hash function creates output values in a constant range regardless of an input value. The concept of the one-way function is superordinate relative to that of the hash function, and the one-way function and the hash function can be used in approximately the same manner. If a high collision resistance is required, it is desirable to use the hash function in view of a wide allowable range of an input value. In the present invention, while the hash function may be obviously used in place of the one-way function, the one-way function may be used in place of the hash function.

Hardware Configuration of Off-Line User Authentication System 200: First Embodiment The configuration of the off-line user authentication system 200 according to the second embodiment will be described below. FIG. 1 is a block diagram showing a hardware configuration of the off-line user authentication system 200 according to the first embodiment. Referring to FIG. 1, the off-line user authentication system 200 generally comprises the off-line authentication support server 201 and the off-line authentication client 251. The off-line authentication support server 201 includes a CPU 201$a$, a RAM 201$b$, a storage device 201$c$, a user interface (user I/F) 201$d$, and an external/network interface (external/network I/F) 201$e$. The storage device 201$c$ has a storage area which stores an OS 201$c$1 and a user-authentication support application 201$c$2 and includes a password storage section 202. The password storage section 202 stores respective user IDs 202$a$ and one-time-password derivation rules 202$b$ of a plurality of users. The off-line authentication client 251 includes a CPU 251$a$, a RAM 251$b$, a storage device 251$c$, a user interface (user I/F) 251$d$, and an external/network interface (external/network I/F) 251$e$. The storage device 251$c$ has a storage area which stores an OS 251$c$1 and a verification data storage section 261. The OS 251$c$1 includes a verification-data request module 251$c$2, a presentation-pattern selection/creation module 251$c$3, and a verification-code determination/authentication module 251$c$4. The verification-data request module 251$c$2 can store a plurality of pattern element sequences 290 and a plurality of verification codes 293. The plurality of pattern element sequences 290 and the plurality of verification codes 293 will hereinafter be referred to collectively as "verification data 294".

In the off-line authentication system 200, the off-line authentication support server 201 is provided as a means to pre-create necessary data for allowing the off-line authentication client 251 to perform user authentication. For example, the off-line authentication support server 201 is composed of a server or a personal computer having the OS 201c1 and the user-authentication support application 201c2 installed thereon. The CPU 201a is a processor adapted to execute the user-authentication support application 201c2 or other application on the OS 201c1 so as to perform a processing of information for supporting user authentication in the off-line authentication client 251. The RAM 201b is a memory for providing a memory space allowing a software stored on the storage device 201c to be read thereon and a work area required when the read software is executed by the CPU 201a. The storage device 201c is provided as a means to store/manage information, such as software and data, and typically composed of a hard disk drive. Preferably, the storage device 201c stores a file of programs of the OS 201c1 and the user-authentication support application 201c2, and these programs will be read on the RAM 201b and executed. As to the programs of the OS 201c1 and the user-authentication support application 201c2, the storage device 201c may be designed to store them on a ROM. In this case, the ROM serves as a firmware as well as a program execution element, such as the CPU 201a. The user I/F 201d is provided as a means to allow data to be input/output from/to a user therethrough, and typically composed of: input means consisting of a keyboard 296 or a pointing device, such as a mouse; output means, such as a display, for displaying information on a screen; and a hardware 1/F between the input and output means. The keyboard 296 may be any suitable type capable of entering pattern elements for forming a one-time password therethrough, such as a numeric keypad or a standard full keyboard. The external/network I/F 201e is adapted to be connected to a storage device, such as a USB memory or a floppy disk, or a network so as to allow information to be input/output from/to the storage device and the network.

The OS 201c1 and the user-authentication support application 201c2 may be combined together in the form of an integrated program. For example, the OS 251c1 may include the functions of the user-authentication support application 201c2. Alternatively, the user-authentication support application 201c2 may be incorporated in another application. Further, each of these OSs may be divided into a plurality of programs.

As long as the verification data 294 can be transmitted, the off-line authentication support server 201 may be connected to the off-line authentication client 251 through any suitable means other than a network. Preferably, the off-line authentication support server 201 is connectable to the off-line authentication client 251 via a network, and pre-transmits the verification data 294 to the off-line authentication client 251 in the online state. Preferably, the network is the internet or an intranet operable in accordance with a TCP/IP-based protocol. When the off-line authentication client 251 in an intranet operates based on a client Windows® OS, the network may be a Windows® domain network operable in accordance with a TCP/IP-based protocol. While the OS in this specification is described by taking Windows® as an example, any other suitable OS, such as Mac OS®, Linux® or Unix®, may be used.

When the off-line authentication support server 201 is connected to the off-line authentication client 251 via a network, the off-line authentication support server 201 is typically disposed on the network, such as the Internet or an intranet, to serve as a Web server for providing verification data 294 for user authentication, to the off-line authentication client 251 accessing via the network. In this case, the verification data 294 is preferably transmitted to the off-line authentication support server 201 in response to a network logon authentication for connecting the off-line authentication client 251 to the same network as the off-line authentication support server 201. Preferably, the network logon authentication is performed in the same manner as that in a user authentication process implemented in the conventional user authentication system 100. In this case, the off-line authentication support server 201 includes the function of the online authentication server 101.

Preferably, in response to logon of the off-line authentication client 251, a program for executing the user authentication process of the present invention is activated to display a logon authentication screen configured to allow a user to select one of logon to a network and logon to a computer. In this case, respective logon authentications in the online and off-line states can be performed in a seamless manner. Further, during network logon authentication of the off-line authentication client 251, a request for creation and transmission of the verification data 294 can be transmitted to the off-line authentication support server 201 using a HTTP protocol or a HTTPS protocol. Thus, just after success of the network logon authentication, the off-line authentication client 251 can acquire the verification data 294 from the off-line authentication support server 201 via a network in a convenient and reliable manner.

The off-line authentication support server 201 may also be configured to serve as a mail server for transmitting an electric mail including the verification data 294 as an attachment to a user. In this case, the off-line authentication client 251 accesses a server for reserving electric mails transmitted from the off-line authentication support server 201 to the user, to receive the eclectic mail and acquirer the verification data 294 attached to the electric mail. The data attached to the electric mail may be the verification data 294 itself or may be a file in an executable format for installing the verification data 294. Preferably, the off-line authentication support server 201 stores mail addresses of system users. The electric mail-based transmission of the verification data 294 can be effectively used when the data transmission from the off-line authentication support server 201 via a network or a recording medium is difficult due to an extended business trip of a user When the off-line authentication support server 201 is not connected to the off-line authentication client 251 via a network, the off-line authentication support server 201 may output the verification data 294 to a recording medium, such as a floppy disk or a USB memory, through the external/network I/F 201e. The output data may be the verification data 294 itself or may be a file in an executable format for installing the verification data 294. The off-line authentication client 251 connects to the recording medium storing the verification data 294 through the external/network I/F 201e to acquire the verification data 294.

The above process of creating the verification data 294 by the off-line authentication support server 201, and acquiring/storing the verification data 294 by the off-line authentication client 251 has to be performed before a user initiates an authentication procedure using the off-line authentication client 251.

The OS 201c1 is an operating system closely related to hardware of the off-line authentication support server 201 and adapted to perform a fundamental information processing.

The user-authentication support application 201c2 is an application software operating on the OS 201c1 to create a plurality of pattern element sequences 290 and a plurality of verification codes 294 and transmit them to the off-line authentication client 251. In the off-line authentication support server 201 composed of a Web server, the user-authentication support application 201c2 is typically a Web server program for providing the verification data 294 through the Web of the Internet or an intranet. In the off-line authentication support server 201 composed of a mail server, the user-authentication support application 201c2 is typically a mail server program including a program for creating the verification data 294 and for providing an electric mail attached with the verification data 294 through the internet or an intranet. The password storage section 202 is typically a certain area of a hard disk drive, and data is preferably stored on the password storage section 202 in the form of an encrypted file. The user ID 202a is data for uniquely identifying each user. Any type of character sequence may be used as the user ID 202a. As mentioned above, the one-time-password derivation rule 202b is a rule to be applied to certain pattern elements included in a presentation pattern 291 at specific positions so as to create a one-time password, and is data serving as a password of a user.

In the off-line user authentication system 200, the off-line authentication client 251 is provided as a means to perform authentication in the off-line state in response to an authentication request from a user. The off-line authentication client 251 is a terminal having the OS 251c1, the verification-data request module 251c2, the presentation-pattern selection/creation module 251c3 and the verification-code determination/authentication module 251c4, which are installed thereon. Specifically, the off-line authentication client 251 is composed of a PC, a portable phone or a personal digital assistant (PDA). The CPU 251a is a processor adapted to execute the verification-data request module 251c2, the presentation-pattern selection/creation module 251c3 and the verification-code determination/authentication module 251c4 or other application together with the OS 251c1 so as to perform a processing of information about user authentication. The RAM 251b is a memory for providing a memory space allowing a software stored on the storage device 251c to be read thereon and a work area required when the read software is executed by the CPU 251a. The storage device 251c is provided as a means to store/manage information, such as software and data, and typically composed of a hard disk drive. Preferably, the storage device 251c stores a file of programs of the OS 251c1, the verification-data request module 251c2, the presentation-pattern selection/creation module 251c3 and the verification-code determination/authentication module 251c4, and these programs will be read on the RAM 251b and executed. As to the OS 251c1, the verification-data request module 251c2, the presentation-pattern selection/creation module 251c3 and the verification-code determination/authentication module 251c4, the storage device 201c may be designed to store their programs on a ROM. In this case, the ROM serves as a firmware as well as a program execution element, such as the CPU 251a. The user I/F 251d is provided as a means to allow data to be input/output from/to a user therethrough. Although not shown, the user I/F 251d is typically composed of: input means consisting of a keyboard 296 or a pointing device, such as a mouse, a track ball or a touch panel; output means, such as a display, for displaying information on a screen; and a hardware I/F between the input and output means. The external/network I/F 251e is adapted to be connected to a storage device, such as a USB memory or a floppy disk drive, or a network so as to allow information to be input/output from/to the storage device and the network. In the case where the off-line authentication client 251 is not connected to the off-line authentication support server 201 via a network, the verification-data request module 251c2 is not essential.

The OS 251c1, the verification-data request module 251c2, the presentation-pattern selection/creation module 251c3 and the verification-code determination/authentication module 251c4 may be partially or entirely combined together in the form of an integrated program. For example, the verification-data request module 251c2, the presentation-pattern selection/creation module 251c3 and the verification-code determination/authentication module 251c4 may be integrated together. Alternatively, they may be independent applications or incorporated in another application. Further, each of them may be divided into a plurality of programs.

The OS 251c1 is an operating system closely related to hardware of the off-line authentication client 251 and adapted to perform a fundamental information processing and serve as a fundamental program depending on the hardware of the off-line authentication client 251. The OS 251c1 may be configured as a firmware having an architecture similar to a platform. The verification-data request module 251c2 is a program for issuing a request for creating and transmitting the verification data 294 to the off-line authentication support server 201. Typically, the verification-data request module 251c2 is configured as a module adapted to be called by the OS 251c1 during network logon authentication. The presentation-pattern selection/creation module 251c3 is a program running together with the OS 251c1 to select one of a plurality of pattern element sequences 291 included in the verification data 294 in accordance with a given selection rule and create a presentation pattern based on the selected pattern element sequence 291. Typically, the presentation-pattern selection/creation module 251c3 is configured as a module adapted to be called by the OS 251c1 during computer logon authentication. The created presentation pattern 291 is displayed on a screen according to the OS 251c1. The verification-code determination/authentication module 251c4 operates together with the OS 251c1 to determine one corresponding to the displayed presentation pattern 291 from a plurality of verification codes 291 included in the verification data 294. Then, the verification-code determination/authentication module 251c4 compares a one-time password 292 entered through the OS 251c1 by a user subject to authentication, with the determined verification cods 291, and successfully authenticates the user if they are identical to one another. Typically, the verification-code determination/authentication module 251c4 is configured as a module adapted to be called by the OS 251c1 during the computer logon authentication. Each of the verification-data request module 251c2, the presentation-pattern selection/creation module 251c3 and the verification-code determination/authentication module 251c4 may be configured as a firmware having an architecture similar to a platform.

Typically, the OS 251c1 is a client Windows® OS. The verification-data request module 251c2 is operable to request the verification data in the online state, for example, during network logon authentication. The presentation-pattern selection/creation module 251c3 and the verification-code determination/authentication module 251c4 are operable to display a presentation pattern 291 on a logon authentication screen of a computer and perform user authentication based on the authentication process of the present invention. In place of standard Windows® logon authentication, the user authentication based on the authentication process of the present invention can be desirably performed in the above manner.

A standard Windows® logon authentication screen is specifically modified as follows. Firstly, a logon authentication module, or a program for performing the functions of the verification-data request module 251c2, the presentation-pattern selection/creation module 251c3 and the verification-code determination/authentication module 251c4, is created as a Windows® DDL file. In this example, a DDL file having a name "SmxGina.dll" is created. Further, a program of a Windows® logon authentication screen is designated as data having a key with a name "GinaDLL" in the following registry location:

HKEY_LOCAL_MACHINE¥SOFTWARE¥Microsoft
¥WindowsNT¥CurrentVersion ¥Winlogn

A standard logon authentication module is a DLL file "msgina.dll", and this DLL file is configured as the above data having the key with the name "GinaDLL". When the data having this key is rewritten as "SmxGina.dll", a logon authentication module implementing the authentication process of the present invention will be called during a logon authentication.

FIG. 14 is a schematic diagram showing images on logon authentication screens 297A, 297B in the off-line user authentication system 200. When the logon authentication module "SmxGina.dll" is activated during logon of Windows®, the logon authentication screen 297A is firstly displayed. A user-name input field and a logon-target input field are displayed on the logon authentication screen 297A. Under the condition that the off-line authentication client 251 is connected to a domain network, a domain name can be entered into the logon-target input field to initiate a Windows®-domain-network logon authentication procedure for authorizing to use the network online. Under the condition that the condition that the off-line authentication client 251 is not connected to a domain network, a domain name can be entered into the logon-target input field to initiate a logon authentication procedure for authorizing to use the computer off-line as a domain network user. Further, a computer name can be entered into the logon-target input field to initiate a computer logon authentication procedure for authorizing to use the computer off-line as a local computer user. When a user enters his/her user ID serving as a request-user ID 281 into the user-name input field, the logon authentication screen 297B including the presentation pattern 291 is displayed. The logon authentication screen 297B has a password input field. When characters, such as numerals, serving as a one-time password are entered into the password input field using the keyboard 296 or the pointing device, marks "*" are displayed one-by-one in response to the input of the characters.

Functional Configuration of Off-Line User
Authentication System 200: First Embodiment FIG. 3 is a functional block of the off-line user authentication system 200 according to the first embodiment. FIG. 3 is a diagram expressing the hardware configuration of the off-line user authentication system 200 illustrated in FIG. 1, from the aspect of information processing to be performed based on cooperation between software and hardware resources, wherein the information processing is illustrated on a functional block-by-functional block basis. In FIG. 3, the off-line authentication server 201 comprises the password storage section 202, request receiving means 203, pattern generation means 204, pattern transmission means 205, verification-code creation means 206 and verification-code transmission means 211. These functional blocks are achieved appropriately in cooperation with hardware elements, such as the RAM 201b, the storage device 201c, the user I/F 201d and the external/network I/F 201e, under the condition that a required part of the user-authentication support application 201c2 and a required part of the OS 201c1 are read from the storage device 201c onto the RAM 201b, and executed by the CPU 201a.

The password storage section 202 is provided as a means to store respective user IDs 202a of a plurality of users and corresponding one-time-password derivation rules 202b serving as respective passwords of the users, in associated relation with each other on a user-by-user basis. The password storage section 202 is a functional block achieved based on cooperation between software and hardware elements, such as the CPU 201a, the RAM 201b and the storage device 201c. The request receiving means 203 is provided as a means to receive a verification-data request for creating and outputting the verification data 294 a user or requestor. The verification-data request includes information about the user ID of the user. The request receiving means 203 is a functional block achieved based on cooperation between software and hardware elements, such as the CPU 201a, the RAM 201b, and the user I/F 201d or the external/network I/F 201e. The verification-data request may be received from the off-line authentication client 251 via a network, or may be entered directly into the off-line authentication support server 201 through the user I/F 201d. The pattern generation means 204 is provided as a means to generate a plurality of pattern element sequences 290 including information about the content of pattern elements for forming presentation patterns 291, in accordance with a given generation rule, such as a random number generation algorithm. The pattern generation means 204 is a functional block achieved based on cooperation between software and hardware elements, such as the CPU 201a and the RAM 201b. The pattern transmission means 205 is provided as a means to output the plurality of generated pattern element sequences 290 to the off-line authentication client 251 so as to allow the generated pattern element sequences 290 to be stored in the off-line authentication client 251. The pattern transmission means 205 is a functional block achieved based on cooperation between software and hardware elements, such as the CPU 201a, the RAM 201b, and the user I/F 201d or the external/network I/F 201e. The plurality of pattern element sequences 290 may be transmitted to the off-line authentication client 251 via a network or may be output to a recording medium. The verification-code creation means 206 is provided as a means to create a plurality of verification codes 293 as a result of applying the one-time-password derivation rule 202b associated with the user having an request-user ID entered through the request receiving means 203 as a password of the user to respective presentation patterns 291 which are formed from the plurality of generated pattern element sequences 290 and to be presented or displayed in the off-line authentication client 251, and subjecting the respective obtained results to a one-way function algorithm. The verification-code creation means 206 is a functional block achieved based on cooperation between software and hardware elements, such as the CPU 201a and the RAM 201b. The verification-code transmission means 211 is provided as a means to output the plurality of generated verification codes 293 to the off-line authentication client 251 so as to allow the generated verification codes 293 to be stored in the off-line authentication client 251. The verification-code transmission means 211 is a functional block achieved based on cooperation between software and hardware elements, such as the CPU 201a, the RAM 201b, and the user I/F 201d or the external/network I/F 201e. The plurality of verification codes 293 may be transmitted to the off-line authentication client 251 via a network or may be output to a recording medium.

The off-line authentication client 251 comprises user-ID input means 252, verification-data request means 253, pattern receiving means 254, pattern display means 255, one-time-password input means 256, verification-data storage section 261, verification-code receiving means 262, pattern selection means 263, verification-code determination means 264 and user authentication means 265. These functional blocks are achieved appropriately in cooperation with hardware elements, such as the RAM 251b, the storage device 251c, the user I/F 251d and the external/network I/F 251e, under the condition that a required part of user-authentication support application 201c2, a required part of presentation-pattern selection/creation module 251c3 and a required part of the OS 251c1 are read from the storage device 251c onto the RAM 251b, and executed by the CPU 251a. In the case where the off-line authentication client 251 does not acquire the verification data 294 from the off-line authentication support server 201 via a network, the verification-data request means 253 is not essential.

The user-ID input means 252 is provided as a means to allow the user subject to authentication to enter his/her user ID therethrough as a request-user ID 281. The user-ID input means 252 is a functional block achieved based on cooperation between software and hardware elements, such as the CPU 251a, the RAM 251b and the user I/F 251d. In the network logon authentication for authorizing a user to use the off-line authentication client 251 in the online state, a request-user ID is sent to the verification-data request means 253, and transmitted together with a verification-data request. The verification-data request means 253 is provided as a means to transmit the verification-data request including information about the entered request-user ID 281 to the off-line authentication support server 201. The verification-data request means 253 is a functional block achieved based on cooperation between software and hardware elements, such as the CPU 251a, the RAM 251b and the external/network I/F 251e. The pattern receiving means 254 is provided as a means to acquire the plurality of pattern element sequences 290 created in the off-line authentication support server 201 and included in the verification data 294. The pattern receiving means 254 is a functional block achieved based on cooperation between software and hardware elements, such as the CPU 251a, the RAM 251b and the external/network I/F 251e. The plurality of pattern element sequences 290 may be acquired from the off-line authentication support server 201 via a network or may be acquired from a recording medium storing them. The pattern display means 255 is provided as a means to arrange pattern elements of one of the pattern element sequences 290 selected by the pattern selection means 263 to create a presentation pattern 291, and display the created presentation pattern on the screen. The pattern display means 255 is a functional block achieved based on cooperation between software and hardware elements, such as the CPU 251a, the RAM 251b and the user I/F 251d. The one-time-password input means 256 is provided as a means to allow the user to enter therethrough a one-time password created from the presentation pattern displayed on the screen. The one-time-password input means 256 is a functional block achieved based on cooperation between software and hardware elements, such as the CPU 251a, the RAM 251b and the user I/F 251d. The verification-data storage section 261 is provided as a means to store the verification data 294 consisting of a plurality of pattern element sequences 294 and a plurality of verification codes 293 for a certain user, in association with the user ID of the user. The verification-data storage section 261 is a functional block achieved based on cooperation between software and hardware elements, such as the CPU 251a, the RAM 251b and the storage device 251c. The verification data 294 stored in the verification-data storage section 261 is acquired from the pattern receiving means 254 and the verification-code receiving means 262, and stored in association with the user ID 202a which is used in the acquired verification data 294. The verification-data storage section 261 can store verification data 294 for a plurality of users. The verification-code receiving means 262 is provided as a means to acquire the plurality of verification codes 293 created in the off-line authentication support server 201 and included in the verification data 294. The verification-code receiving means 262 is a functional block achieved based on cooperation between software and hardware elements, such as the CPU 251a, the RAM 251b and the user I/F 251d. The plurality of verification codes 293 may be acquired from the off-line authentication support server 201 via a network or may be acquired from a recording medium storing them. The pattern selection means 263 is provided as a means to check whether a user ID identical to the request-user ID 281 is stored in the verification-data storage section 261 (or included in the stored user IDs 202a), and if the stored user IDs 202a includes one corresponding to the request-user ID 281, select one of the plurality of pattern element sequences 290 included in the verification data 294 associated with the user ID 202a corresponding to the request-user ID 281, so as to determine one pattern element sequence 190 for use in creating a presentation pattern 191. The pattern selection means 263 is a functional block achieved based on cooperation between software and hardware elements, such as the CPU 251a, the RAM 251b and the storage device 251c. The verification code determination means 264 is provided as a means to determine one of the plurality of verification codes 293 which corresponds to the pattern element sequence 290 selected by the pattern selection means 263. The verification code determination means 264 is a functional block achieved based on cooperation between software and hardware elements, such as the CPU 251a, the RAM 251b and the storage device 251c. The user authentication means 265 is provided as a means to compare with a value obtained by subjecting the entered one-time password 291 to the same one-way function algorithm as that used in creating the verification codes 293, with the determined verification code 293, and successfully authenticate the user if they are identical to one another.

More specifically, the off-line user authentication system 200 according to the first embodiment has the following configuration. The off-line authentication support server 201 has the same functions as those of the online authentication server 101 of the conventional online user authentication system 100, and the off-line authentication client 251 carries out user authentication via network based on the functions. The off-line authentication client 251 operates based on the client Windows® OS. When a user logons to Windows®, the logon authentication module "SmxGinaDLL" is activated, and the logon authentication screen 297A is displayed. When a network logon authentication is requested by designating a domain name as a logon target using the logon authentication screen 297A, under the condition that the off-line authentication client 251 is connected to the domain network, the logon authentication screen 297 is additionally displayed, and the same user authentication process as that in the conventional online user authentication system 100 is performed. If the network logon authentication is successful, a verification-data request is transmitted from the off-line authentication client 251 to the off-line authentication support server 201. The off-line authentication client 251 acquires verification data 294 from the off-line authentication support server 201 online, and pre-stores the verification data 294. When a computer logon authentication is requested by designating a domain or computer name as a logon target using the logon authentication screen 297A, under the condition that the off-line authentication client 251 is not connected to the domain network, the logon authentication screen 297B is additionally displayed, and the off-line authentication process of the present invention is performed based on the pre-stored verification data 294.

[Operation of Off-Line User Authentication System 200]

An operation of the off-line user authentication system 200 will be described below. The operation of the off-line user authentication system 200 is roughly divided into two stages. In the first stage, the off-line authentication client 251 makes a response to the off-line authentication support server 201 for creating verification data 294 for a user to be authenticated, and acquires/stores the created verification data 294 in advance. In the second stage, the off-line authentication client 251 carries out authentication for the user subject to authentication, based on the pre-stored verification data 294 off-line.

[Operation I of Off-Line User Authentication System 200: Verification Data Acquisition]

Figure 5:
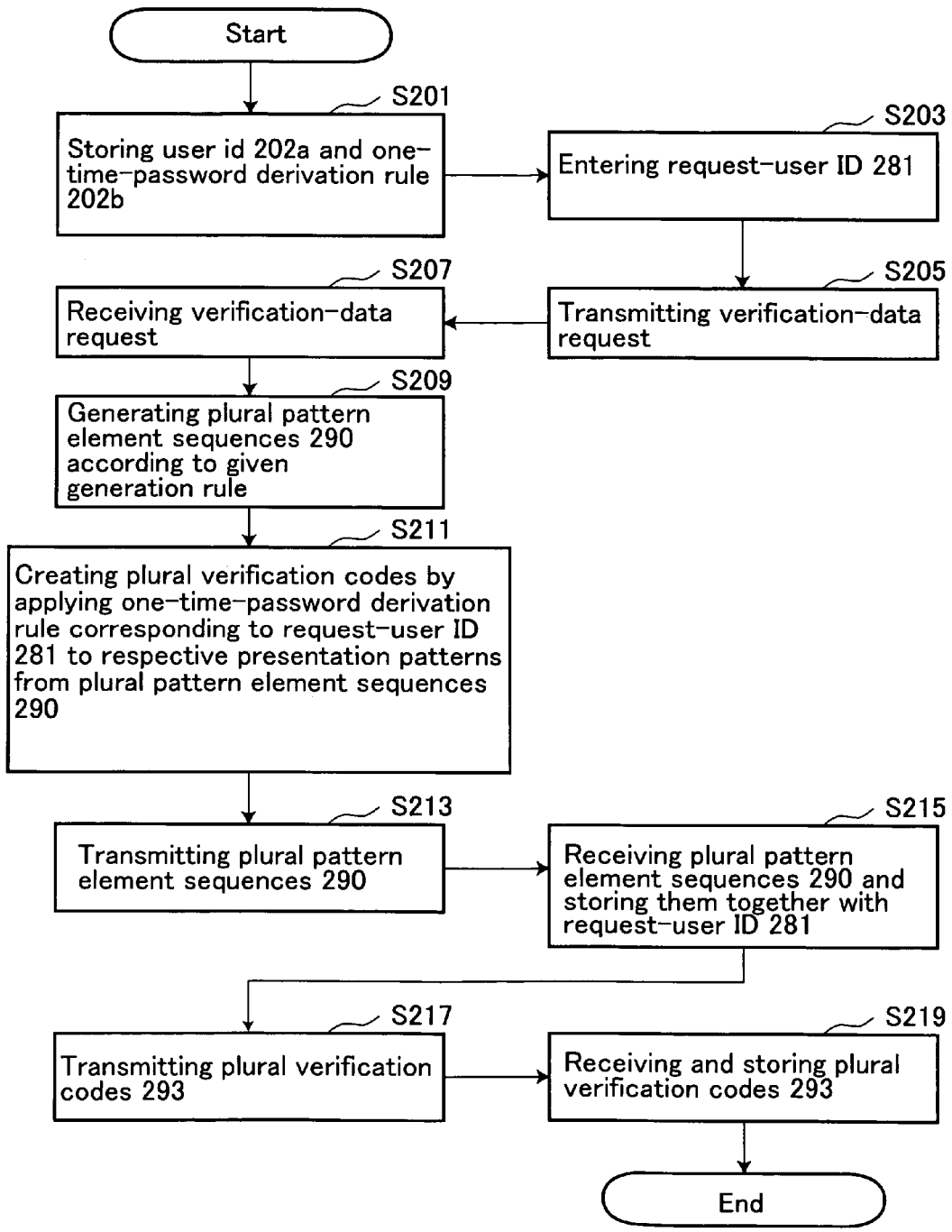
FIG. 5 is a flowchart showing an operation for verification data acquisition in the off-line user authentication system 200 according to the first embodiment.

The flow of an operation for acquiring verification data 294 will be described below. FIG. 5 is a flowchart showing the operation for acquiring verification data in the off-line user authentication system 200. A user who intends to obtain authentication using the off-line user authentication system 200 enters and registers his/her user ID 202*a* and a one-time-password derivation rule 202*b* serving as a password of the user, into/on the off-line authentication support server 201 in advance. In advance of user authentication, the password storage section 202 stores the user ID 202*a* and the one-time-password derivation rule 202*b* of the user in associated relation with one another (Step S201). Specifically, the off-line authentication support server 201 preferably provides a Web page or a resource for registration of a user ID and a password, on the Web of the Internet or an intranet. Through the Web page, the user accesses the off-line authentication support server 201 from a terminal, such as the off-line authentication client 251. In response to the access, an input field for entering a user ID therethrough and a first presentation pattern 291 having numerals of 0 (zero) to 9 serving as pattern elements arranged in random order are displayed on a screen of the off-line authentication client 251 (not shown). The user enters a desired user ID 202*a* to be registered, into the input field. Then, the user selects certain ones of the pattern elements included in the first presentation pattern 291 at specific positions and enters one or more characters, such as numerals, without being based on the presentation pattern 291, in accordance with a selected one-time-password derivation rule 202*b* to be registered. The off-line authentication support server 201 stores the entered user ID 202*a* on the password storage section 202 as a user ID of the user. The selected one-time-password derivation rule 202*b* cannot be specified only by the selected or entered numeric sequence. Thus, the off-line authentication support server 201 displays a second present pattern 291 different from the first presentation pattern, on the screen of the off-line authentication client 251 to prompt the user to select or enter numerals again, in accordance with the selected one-time-password derivation rule 202*b*, and then compares this select or enter numeric sequence with the previous numeric sequence to specify the selected one-time-password derivation rule 202*b*. The second presentation pattern 291 can be generated in such a manner as to be largely different from the first present pattern 291, to allow the selected one-time-password derivation rule 202*b* to be specified by presenting the presentation pattern 291 only twice. If the selected one-time-password derivation rule 202*b* cannot be specified by presenting the presentation pattern 291 twice, the presentation pattern 291 will be repeatedly presented while changing the content thereof until the selected one-time-password derivation rule 202*b* can be specified. In this manner, the selected one-time-password derivation rule 202*b* consisting of a combination of respective positions of certain ones to be selected from the pattern elements included in the presentation pattern 291, one or more characters to be entered without being based on the presentation pattern 291, and a selection or input order of the certain pattern elements and the characters is specified. The specified one-time-password derivation rule 202*b* is stored on the password storage section 202 in association with the user ID 202*a* of the user.

Figure 9:
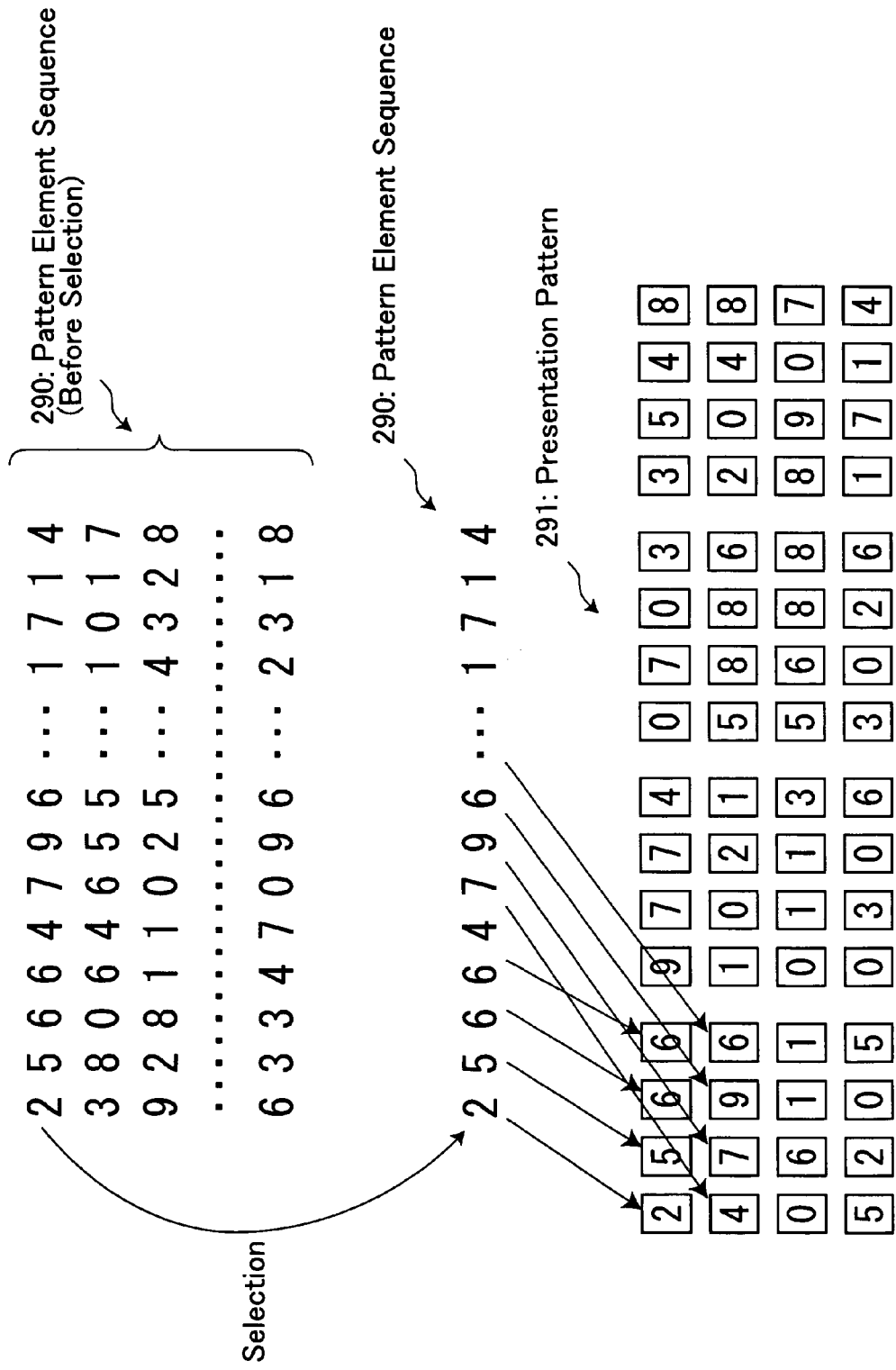
FIG. 9 is an explanatory conceptual diagram showing a process of creating a presentation pattern in the off-line user authentication system 200 according to the first embodiment.

Then, the user subject to authentication enters his/her user ID as a request-user ID 281 through the user ID input means 252 in the off-line authentication client 251 (Step S203). In a typical example, under the condition that the off-line authentication client 251 is connected to the domain network, the user enters his/her user ID into the user name input field, and a domain name in the logon target input field to make a request for user authentication. Through this operation, the request-user ID 281 is entered into the off-line authentication client 251. Then, the logon authentication screen 297B is displayed, and a user authentication process is performed in the same manner as that in the user authentication process implemented in the conventional online user authentication system 100. If the user is successfully authenticated, the verification-data request means 253 in the off-line authentication client 251 transmits a request for creating and outputting verification data 294 to the off-line authentication support server 201 together with the entered request-user ID 281 (Step S205). In a typical example, the logon module "SmxGinaDLL" operating to display the logon authentication screen 297A, 297B accesses a resource for providing the verification data 294 on a network to send data about the verification-data request data including the request-user ID 281 thereto. Typically, the resource is Java® servlet accessible by a HTTPS protocol. Then, the request receiving means 203 in the off-line authentication support server 201 receives the verification-data request including the request-user ID 281 from the off-line authentication client 251 (Step S207). Typically, the off-line authentication support server 201 activates the user-authentication support application 201*c*2, and receives the request-user ID 281 through the user-authentication support application 201*c*2. Then, the pattern generation means 204 in the off-line authentication support server 201 generates a plurality of pattern element sequences 290 in accordance with a given generation rule (Step S209). Typically, the given generation rule is designed to generate sixty four random numbers. In FIG. 9, "25664796 - - - 1714" is shown as one example of the pattern element sequence 290 (before selection).

Then, the verification code generation means 206 in the off-line authentication support server 201 creates a plurality of verification codes 293 by applying the one-tome password derivation rule 202*b* associated with the request-user ID 281 received from the off-line authentication client 251, to respective sets of pattern elements included in a plurality of presentation patterns 291 formed from the plurality of generated pattern element sequences 290, and subjecting the respective obtained results to a one-way function algorithm (Step S211). Then, the pattern transmission means 205 in the off-line authentication support server 201 transmits the plurality of generated pattern element sequences 290 to the off-line authentication client 251 (Step S213). Typically, the off-line authentication support server 201 activates the user-authentication support application 201c2, and transmits the plurality of generated pattern element sequences 290 to the off-line authentication client 251 through the user-authentication support application 201c2. Then, the pattern receiving means 254 in the off-line authentication client 251 receives the plurality of pattern element sequences 290 transmitted from the off-line authentication support server 201, and the plurality of received pattern element sequences 290 are stored in the verification data storage section 261 together with the request-user ID 281 (Step S215). Typically, the logon authentication module "SmxGinaDLL" running on the off-line authentication client 251 receives and stores the plurality of pattern element sequences 290. Then, the verification-code transmission means 211 in the off-line authentication support server 201 transmits the plurality of generated verification codes 293 to the off-line authentication client 251 (Step S217). Typically, the off-line authentication support server 201 activates the user-authentication support application 201c2, and transmits the plurality of verification codes 293 the off-line authentication client 251 through the user-authentication support application 201c2. Then, the verification-code receiving means 262 in the off-line authentication client 251 receives the plurality of verification codes 293 transmitted from the off-line authentication support server 201, and the plurality of received verification codes 293 are stored in the verification-data storage section 261 (Step S219). Typically, the logon authentication module "SmxGinaDLL" running on the off-line authentication client 251 receives and stores the plurality of received verification codes 293. Through the above operations, the verification data 294 associated with the request-user ID 281 is stored in the off-line authentication client 251, and the preparation for off-line user authenticate is completed.

The verification-data request may be entered directly into the off-line authentication support server 201. In this case, a verification-data request including the request-user ID 281 is entered into the off-line authentication support server 201, and corresponding verification data 294 is output to a recording medium or the like. The off-line authentication client 251 reads the verification data 294 from the recording medium, and stores the verification data 294.

[Operation II of Off-Line User Authentication System 200: User Authentication]

Figure 6:
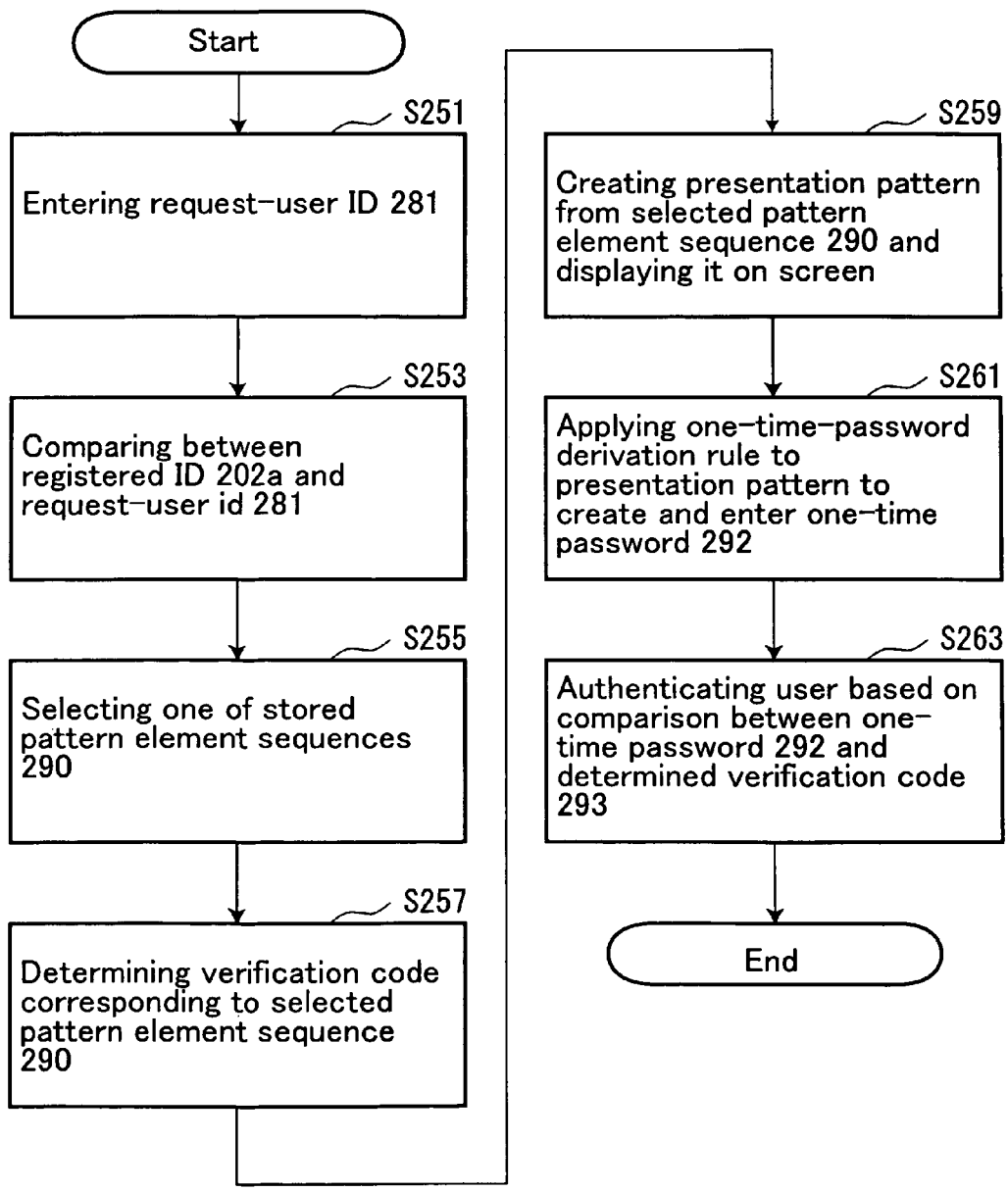
FIG. 6 is a flowchart showing an operation for off-line user authentication in the off-line user authentication system 200 according to the first embodiment.

The flow of an operation for user authentication in the off-line state will be described below. FIG. 6 is a flowchart showing the operation for off-line user authentication in the off-line user authentication system 200. Firstly, a user subject to authentication enters his/her user ID into the off-line authentication client 251 through the user ID input means 256 (Step S251). Typically, under the condition that the off-line authentication client 251 is not connected to the domain network, the user enters his/her user ID into the user name input field, and designates a domain or computer name using the logon target input field in the Windows® logon authentication screen 297A to make a request for user authentication and enter the request-user ID 281. Then, the pattern selection means 263 in the off-line authentication client 251 checks whether the request-user ID 281 is included in the stored user ID 202a in the verification-data storage section 261 (Step S253). Through this step, it is determined that the verification data 294 corresponding to the user subjected to authentication is stored and thereby off-line user authentication can be performed. Then, the pattern selection means 263 in the off-line authentication client 251 selects one of the plurality of pattern element sequences 290 associated with the request-user ID 281 in accordance with a given rule (Step S255). As to the selection of the pattern element sequences 290, any one of the pattern element sequences 290 which has already been used for authentication for the user is not repeatedly selected, until new verification data is subsequently acquired from the off-line authentication support server 201 and stored. This makes it possible to display a different presentation pattern every time so as to protect against brute-force attack and provide enhanced security. For example, when 100 pattern element sequences 290 are stored, off-line user authentication can be continuously performed 100 times before acquisition of new verification. This system is designed to indicate a warning when the number of remaining pattern element sequences becomes few. If each of the pattern element sequences is selected once, new user authentication cannot be further performed for the user. Then, the verification-code determination means 262 in the off-line authentication client 251 determines one of the plurality verification codes 293 associated with the request-user ID 281, which corresponds to the pattern element sequence 290 selected in Step S255 (Step S257). Then, the pattern display means 255 in the off-line authentication client 251 creates an image of a presentation pattern 291 formed by arranging pattern elements of the pattern element sequence 290, respectively, at element positions in a given pattern format consisting of four 4×4 matrixes, and displays the image on the screen of the off-line authentication client 251 (Step S259). Typically, as shown in FIG. 14, in addition to the logon authentication screen 297A, the logon authentication screen 297B including the presentation pattern 291 is displayed.

Then, the user subjected to authentication selects certain pattern elements at specific positions in the presentation pattern 191 displayed on the screen of the off-line authentication client 251, and enters one or more characters, such as numeral, without being based on the presentation pattern 191, in order, so as to create a one-time password 292 as a result of applying the one-time-password derivation rule 202b of the user to the displayed presentation pattern 291, and enter the created one-time password to the off-line authentication client 251. The one-time-password input means 256 in the off-line authentication client 251 allow the user to enter the created one-time password 292 (Step S261).

Then, the user authentication means 265 in the off-line authentication client 251 compares a value obtained by subjecting the entered one-time password 292 to the same one-way function algorithm as that used in creating the verification codes 293, with the determined verification code 293, and successfully authenticates the user if then are identical to one another (Step S263).

Hardware Configuration of Off-Line User Authentication System 300: Second Embodiment A hardware configuration of the off-line user authentication system 300 according to the second embodiment will be described below with a focus on a difference from the off-line user authentication system 200 according to the first embodiment. Except that the off-line user authentication system 300 employs a pattern seed value 383 during authentication in the off-line state, instead of the pattern element sequence 290, the configuration of the off-line user authentication system 300 is approximately the same as that of the off-line user authentication system 200. The configuration of the off-line user authentication system 300 will be firstly described. FIG. 2 is a block diagram showing a hardware configuration of the off-line user authentication system 300 according to the second embodiment. Referring to FIG. 2, the off-line user authentication system 300 generally comprises the off-line authentication support server 301 and the off-line authentication client 351. The off-line authentication support server 301 has the same configuration as that of the off-line authentication support server 201. Except that a seed-value selection/pattern creation module 351c3 is stored in the OS 351c1, and a pattern seed value 383 is stored in the verification-data storage section 361, the off-line authentication client 351 has approximately the same configuration to that of the off-line authentication client 251. The verification-data storage section 361 stores a plurality of pattern seed values 383 and a plurality of verification codes 393. The plurality of pattern seed values 383 and the plurality of verification codes 393 will hereinafter be referred to collectively as "verification data 394".

Except that the user-authentication support application 301c2 is an application software running on the OS 301c1 to create pattern seed values 383 and verification codes 394 and transmit them to the off-line authentication client 351, each component of the off-line authentication support server 301 is substantially structurally and functionally the same as that of the off-line authentication support server 201.

In the off-line user authentication system 300, the off-line authentication client 351 is provided as a means to perform authentication in the off-line state in response to an authentication request from a user. The off-line authentication client 351 is a terminal having the OS 351c1, the verification-data request module 351c2, the seed-value selection/pattern creation module 351c3 and the verification-code determination/authentication module 351c4, which are installed thereon. Except for the above components, the off-line authentication client 351 has approximately functionally the same as the off-line authentication client 251.

The seed-value selection/pattern creation module 351c3 is a program operating together with the OS 351c1 to select one of a plurality of pattern seed values 383 included in the verification data, in accordance with a given selection rule, and create a pattern element sequence 390 and further a presentation pattern 391, based on the selected pattern seed value 383.

Functional Configuration of Off-Line User Authentication System 300: Second Embodiment FIG. 4 is a functional block diagram showing the off-line user authentication system 300 of the second embodiment. FIG. 4 is a diagram expressing the hardware configuration of the off-line user authentication system 300 illustrated in FIG. 2, from the aspect of information processing to be performed based on cooperation between software and hardware resources, wherein the information processing is illustrated on a functional block-by-functional block basis. In FIG. 4, the off-line authentication server 301 comprises the password storage section 302, request receiving means 303, pattern-seed-value generation means 321, pattern-seed-value transmission means 322, verification-code creation means 306 and verification-code transmission means 211. These functional blocks are achieved appropriately in cooperation with hardware elements, such as the RAM 301b, the storage device 301c, the user I/F 301d and the external/network I/F 301e, under the condition that a required part of the user-authentication support application 301c2 and a required part of the OS 301c1 are read from the storage device 301c onto the RAM 301b, and executed by the CPU 301a.

Each of the password storage section 302 and the request receiving means 303 has the same structure as that of the corresponding component in the off-line user authentication system 200. The pattern-seed-value generation means 321 is provided as a means to generate, in accordance with a given generation rule" a plurality of pattern seed values 383 each adapted to define a presentation pattern 391 in cooperation with a user ID. The pattern-seed-value generation means 321 is a functional block achieved based on cooperation between software and hardware elements, such as the CPU 301a and the RAM 301b. The pattern-seed-value transmission means 322 is provided as a means to output the plurality of generated pattern seed value 383 to the off-line authentication client 351 so as to allow the generated pattern seed value 383 to be stored in the off-line authentication client 351. The pattern-seed-value transmission means 322 is a functional block achieved based on cooperation between software and hardware elements, such as the CPU 301a, the RAM 301b, and the user I/F 301d or the external/network I/F 301e. The plurality of pattern seed values 383 may be transmitted to the off-line authentication client 351 via a network or may be output to a recording medium. The verification-code creation means 306 is provided as a means to create a plurality of verification codes 393 as a result of applying the one-time-password derivation rule 302b associated with an request-user ID entered through the request receiving means 303, to respective presentation patterns 391 which are formed from a plurality of pattern element sequences 390 created based on the request-user ID and the plurality of generated pattern seed values 383 and in accordance with a given pattern-element-sequence creation rule, and subjecting the respective obtained results to a one-way function algorithm. The verification-code creation means 306 is a functional block achieved based on cooperation between software and hardware elements, such as the CPU 301a and the RAM 301b. The verification-code transmission means 311 has the same structure as that of the corresponding component in the off-line user authentication system 200.

The off-line authentication client 351 comprises user-ID input means 352, verification-data request means 353, pattern display means 355, one-time-password input means 356, verification-data storage section 361, verification-code receiving means 362, verification-code determination means 364, user authentication means 365, pattern-seed-value receiving means 371, pattern-seed-value selection means 372 and pattern-element-sequence creation means 373. These functional blocks are achieved appropriately in cooperation with hardware elements, such as the RAM 351b, the storage device 351c, the user I/F 351d and the external/network I/F 351e, under the condition that a required part of user-authentication support application 301c2, a required part of seed-value selection/pattern creation module 351c3 and a required part of the OS 351c1 are read from the storage device 351c onto the RAM 351b, and executed by the CPU 351a. In the case where the off-line authentication client 351 does not acquire the verification data 394 from the off-line authentication support server 301 via a network, the verification-data request means 353 is not essential.

Each of the user-ID input means 352 and the verification-data request means 353 has the same structure as that of the corresponding component in the off-line user authentication system 200. The pattern display means 355 is provided as a means to arrange pattern elements of a pattern element sequence 390 created by the pattern-element-sequence creation means 373, in the given pattern format 391p, to create a presentation pattern 391, and display the created presentation pattern on the screen. The pattern display means 355 is a functional block achieved based on cooperation between software and hardware elements, such as the CPU 351a, the RAM 351*b* and the user I/F 351*d*. The one-time-password input means 356 has the same structure as that of the corresponding component in the off-line user authentication system 200. The verification-data storage section 361 is provided as a means to store the verification data 394 consisting of a plurality of pattern seed values 383 and a plurality of verification codes 393 for a certain user, in association with the user ID of the user. The verification-data storage section 361 is a functional block achieved based on cooperation between software and hardware elements, such as the CPU 351*a*, the RAM 351*b* and the storage device 351*c*. The verification data 394 stored in the verification-data storage section 361 is acquired from the pattern-seed-value receiving means 371 and the verification-code receiving means 362, and stored in association with the user ID 302*a* which is used in the acquired verification data 394. The verification-data storage section 361 can store verification data 394 for a plurality of users. The verification-code receiving means 362 has the same structure as that of the corresponding component in the off-line user authentication system 200. The verification code determination means 364 is provided as a means to determine one of the plurality of verification codes 393 which corresponds to the pattern seed value 383 selected by the pattern-seed-value selection means 372. The verification code determination means 364 is a functional block achieved based on cooperation between software and hardware elements, such as the CPU 351*a*, the RAM 351*b* and the storage device 351*c*. The user authentication means 365 has the same structure as that of the corresponding component in the off-line user authentication system 200. The pattern-seed-value receiving means 371 is provided as a means to acquire the plurality of pattern seed values 383 included in the verification data 394 created by the off-line authentication support server 301. The pattern-seed-value receiving means 371 is a functional block achieved based on cooperation between software and hardware elements, such as the CPU 301*a*, the RAM 301*b*, and the user I/F 301*d* or the external/network I/F 301*e*. The plurality of pattern seed values 383 may be acquired from the off-line authentication support server 301 via a net work or may be acquired through a recording medium storing them. The pattern-seed-value selection means 372 is provided as a means to check whether a user ID identical to the request-user ID 281 is stored in the verification-data storage section 361 (or included in the stored user IDs 302*a*), and if the stored user IDs 302*a* includes one corresponding to the request-user ID 381, select one of the plurality of pattern seed values 383 included in the verification data 394 associated with the user ID 302*a* corresponding to the request-user ID 381, so as to determine a single pattern seed value 383 for use in creating a presentation pattern 391 in cooperation with the request-user ID 381. The pattern-seed-value selection means 372 is a functional block achieved based on cooperation between software and hardware elements, such as the CPU 351*a*, the RAM 351*b* and the storage device 351*c*. The pattern-element-sequence creation means 373 is provided as a means to create pattern elements to be included in a presentation pattern 391 based on the pattern seed value 383 selected by the pattern-seed-value selection means 372 and the request-user ID 381 and in accordance with a given creation rule. The pattern-element-sequence creation means 373 is a functional block achieved based on cooperation between software and hardware elements, such as the CPU 351*a* and the RAM 351*b*.

The remaining configuration of the off-line user authentication system 300 according to the second embodiment is substantially the same as that of the off-line user authentication system 200.

[Operation of Off-Line User Authentication System 300]

An operation of the off-line user authentication system 300 will be described below. The operation of the off-line user authentication system 300 is roughly divided into two stages. In the first stage, the off-line user authentication system 300 creates verification data 394 for a user to be authenticated, and then acquired/stored. In the second stage, the off-line authentication client 351 carries out authentication for the user subject to authentication, based on the pre-stored verification data 394 off-line.

[Operation I of Off-Line User Authentication System 300: Verification Data Acquisition]

Figure 7:
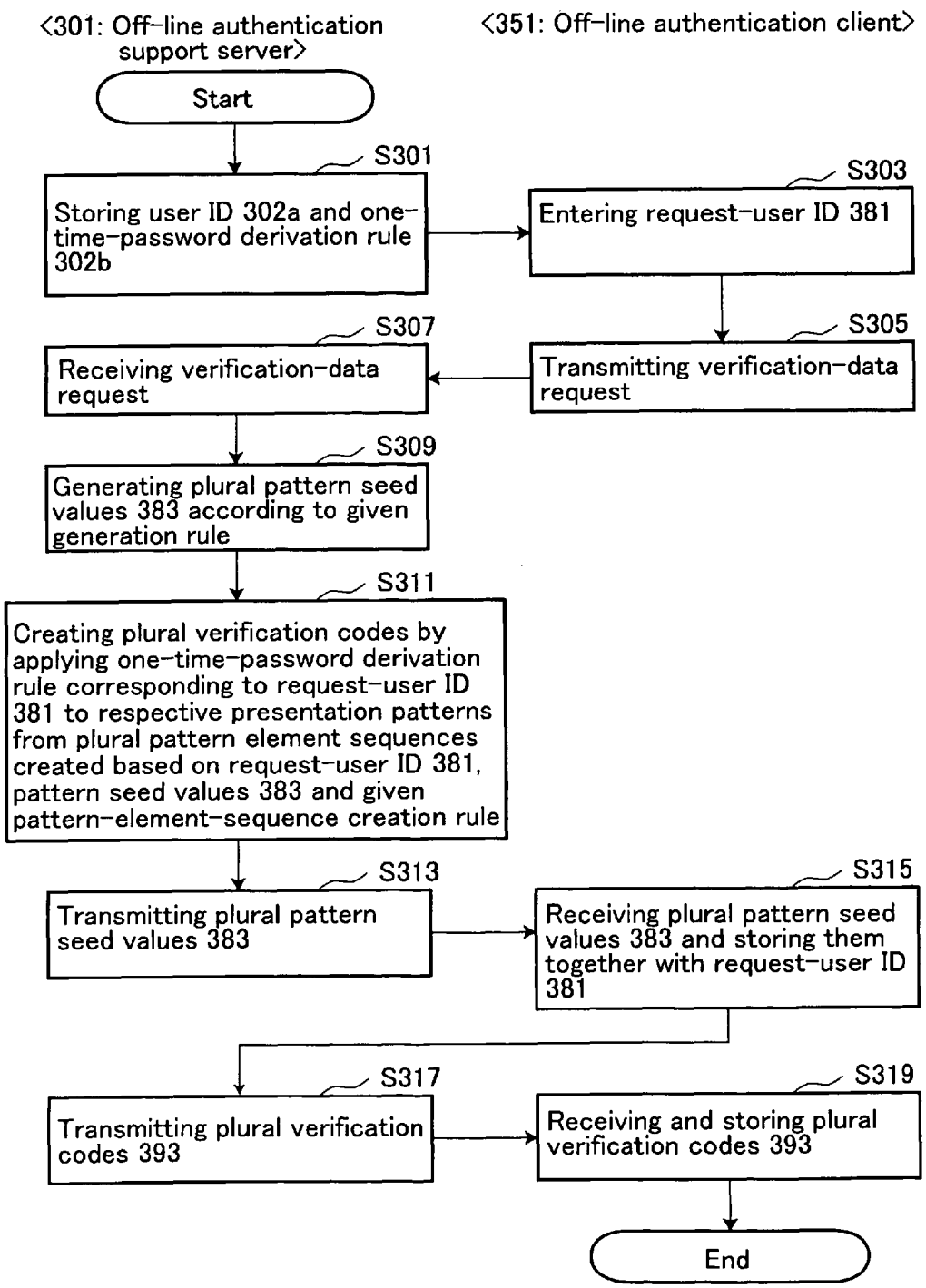
FIG. 7 is a flowchart showing an operation for verification data acquisition in the off-line user authentication system 300 according to the second embodiment.

The flow of an operation for acquiring verification data 394 will be described below. FIG. 7 is a flowchart showing the operation for acquiring verification data in the off-line user authentication system 300. A user who intends to obtain authentication using the off-line user authentication system 300 enters and registers his/her user ID 302*a* and a one-time-password derivation rule 302*b* serving as a password of the user, into/on the off-line authentication support server 301 in advance. In advance of user authentication, the password storage section 302 stores the user ID 302*a* and the one-time-password derivation rule 302*b* of the user in associated relation with one another (Step S301).

Figure 10:
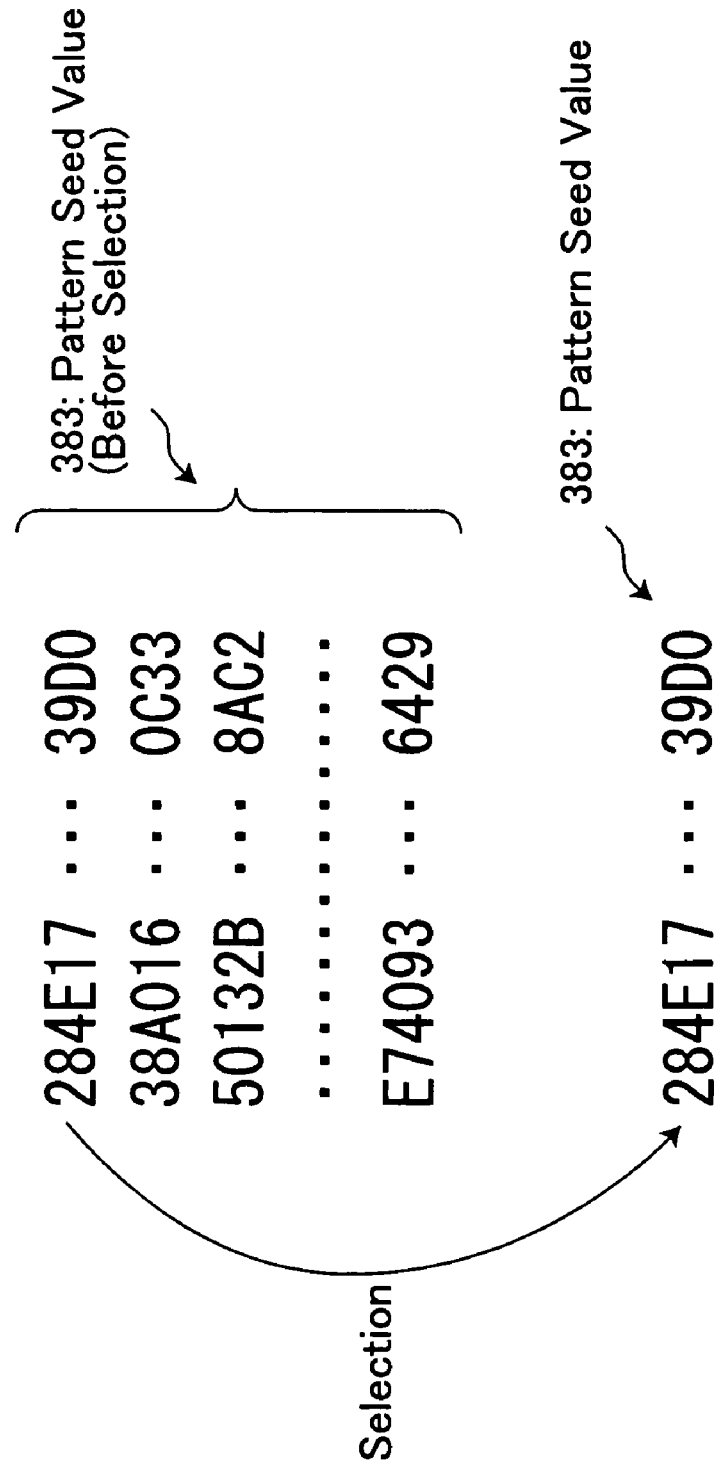
FIG. 10 is an explanatory conceptual diagram showing a process of creating a presentation pattern in the off-line user authentication system 300 according to the second embodiment.

Then, the user subject to authentication enters his/her user ID as a request-user ID 381 through the user ID input means 352 in the off-line authentication client 351 (Step S303). Then, the verification-data request means 353 in the off-line authentication client 351 transmits a request for creating and outputting verification data 394 to the off-line authentication support server 301 together with the entered request-user ID 381 (Step S305). Then, the request receiving means 303 in the off-line authentication support server 301 receives the verification-data request including the request-user ID 381 from the off-line authentication client 351 (Step S307). Then, the pattern-seed-value generation means 321 in the off-line authentication support server 301 generates a plurality of pattern seed values 383 in accordance with a given generation rule (Step S309). Typically, the given generation rule is to generate random numbers within a given range. As one example of the pattern seed value 383, FIG. 10 shows "284E17 - - - 39D0" expressed in hexadecimal. For example, the pattern seed value 383 may be expressed by a numeric sequence having a given bit length, such as 8-byte. In this case, the given range is a range of "0000000000000000" to "FFFFFFFFFFFFFFFF" in hexadecimal. Thus, with respect to the same user ID 302*a*, any numeric sequence within the given range may be used as a pattern seed value 383. Thus, the number of different presentation patterns 391 to be created can be increased up to the number of pattern seed values included in the given range.

Then, the verification code generation means 306 in the off-line authentication support server 301 creates a plurality of verification codes 393 by applying the one-tome password derivation rule 302*b* associated with the request-user ID 381, to respective sets of pattern elements included in a plurality of presentation patterns 391 formed from a plurality of pattern element sequences 390 which are created based on the request-user ID 381 and the plurality of generated patter seed values 383 and in accordance with a given pattern-element-sequence creation rule, and subjecting the respective obtained results to a one-way function algorithm (Step S311). Then, the pattern-seed-value transmission means 322 in the off-line authentication support server 301 transmits the plurality of generated pattern seed values 383 to the off-line authentication client 351 (Step S313). Then, the pattern-seed-value receiving means 371 in the off-line authentication client 351 receives the plurality of pattern seed values 383 transmitted from the off-line authentication support server 301, and the plurality of received pattern seed values 383 are stored in the verification data storage section 361 together with the request-user ID 381 (Step S315). Then, the verification-code transmission means 311 in the off-line authentication support server 301 transmits the plurality of generated verification codes 393 to the off-line authentication client 351 (Step S317). Then, the verification-code receiving means 362 in the off-line authentication client 351 receives the plurality of verification codes 393 transmitted from the off-line authentication support server 301, and the plurality of received verification codes 393 are stored in the verification-data storage section 361 (Step S319). Through the above operations, the verification data 394 associated with the request-user ID 381 is stored in the off-line authentication client 351, and the preparation for off-line user authenticate is completed.

The verification-data request may be entered directly into the off-line authentication support server 301. In this case, a verification-data request including the request-user ID 381 is entered into the off-line authentication support server 301, and corresponding verification data 394 is output to a recording medium or the like. The off-line authentication client 351 reads the verification data 394 from the recording medium, and stores the verification data 394.

[Operation II of Off-Line User Authentication System 300: User Authentication]

Figure 8:
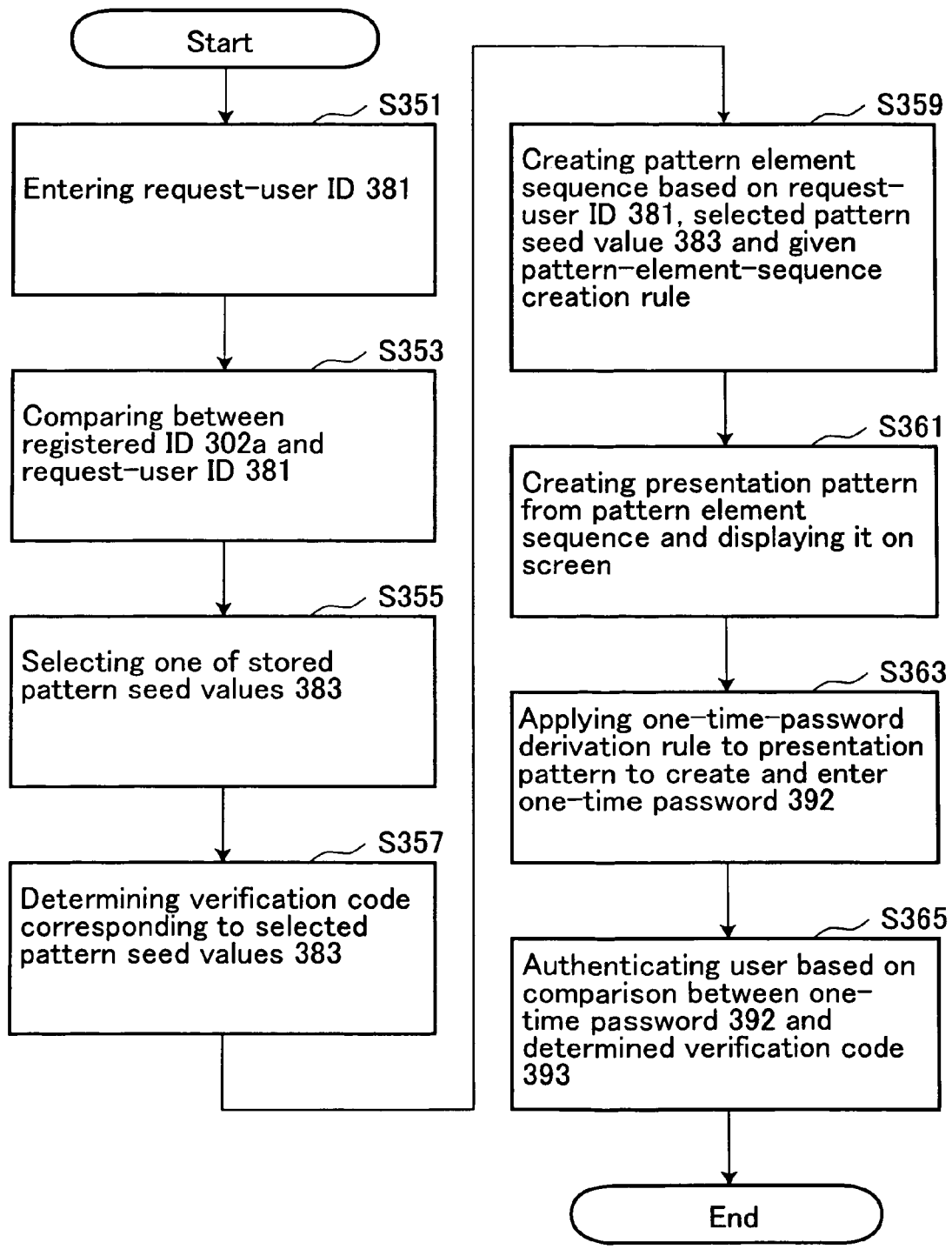
FIG. 8 is a flowchart showing an operation for off-line user authentication in the off-line user authentication system 300 according to the second embodiment.
Figure 11:
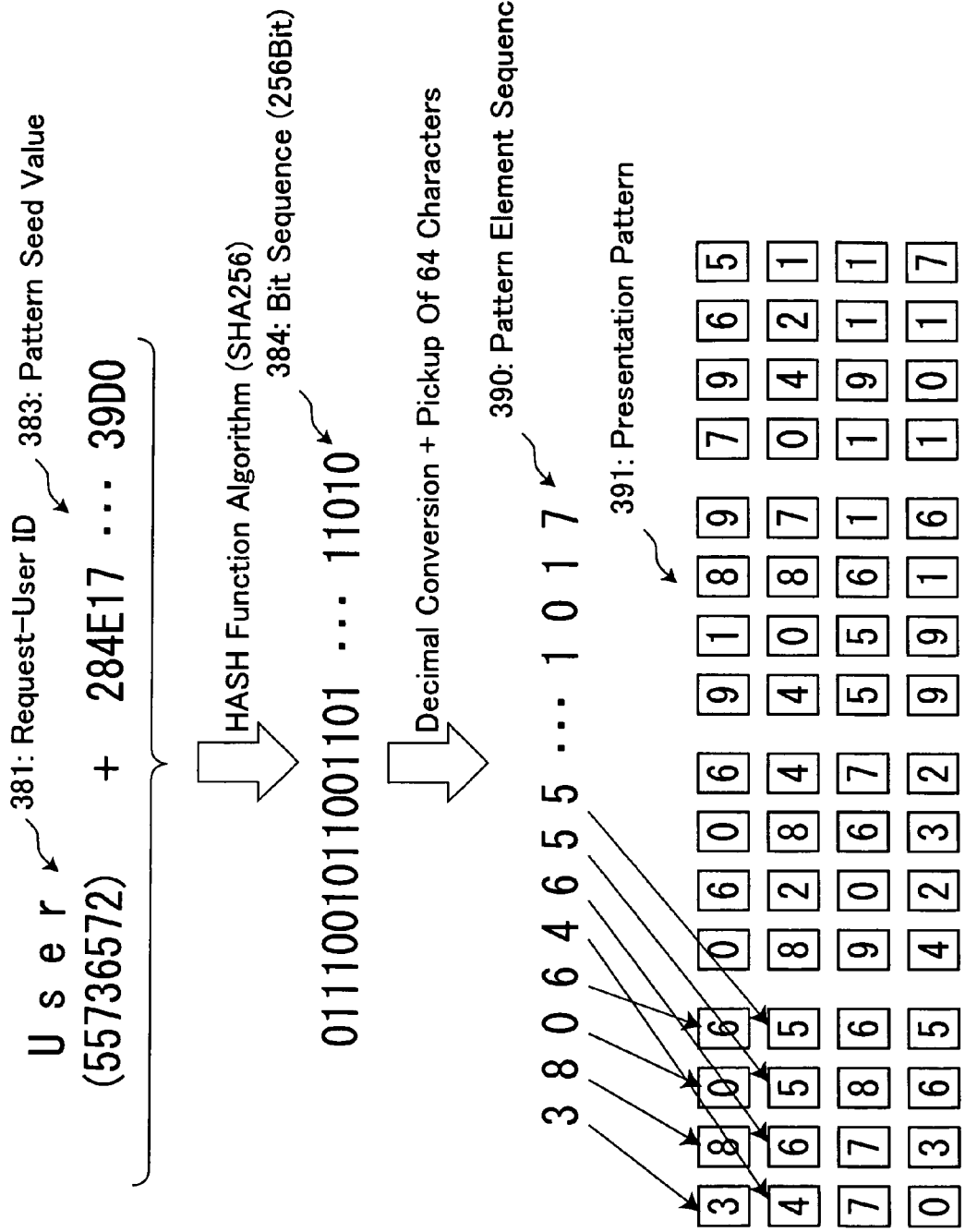
FIG. 11 is an explanatory conceptual diagram showing a process of creating a presentation pattern in the off-line user authentication system 300 according to the second embodiment, which is continued from the flowchart in FIG. 10.

The flow of an operation for user authentication in the off-line state will be described below. FIG. 8 is a flowchart showing the operation for off-line user authentication in the off-line user authentication system 300. Firstly, a user subject to authentication enters his/her user ID into the off-line authentication client 351 through the user ID input means 356 (Step S351). Then, the pattern-seed-value selection means 372 in the off-line authentication client 351 checks whether the request-user ID 381 is included in the stored user ID 302a in the verification-data storage section 361 (Step S253). Then, the pattern-seed-value selection means 372 in the off-line authentication client 351 selects one of the plurality of pattern seed values 383 associated with the request-user ID 381 in accordance with a given rule (Step S355). Then, the verification-code determination means 362 in the off-line authentication client 351 determines one of the plurality verification codes 393 associated with the request-user ID 381, which corresponds to the pattern seed values 383 selected in Step S355 (Step S357). Then, the pattern-element-sequence creation means 373 in the off-line authentication client 351 creates a pattern element sequence 390 for forming a presentation pattern 391, based on the request-user ID 381 entered in Step S351 and the pattern seed value 383 selected in Step S355 and in accordance with a given pattern-element-sequence generation rule. The given pattern-element-sequence creation rule means a rule for generating a pattern element sequence uniquely determined based on a combination of the request-user ID 381 and the pattern seed value 383, in such a manner as to provide significant difficulty in estimating the original request-user ID 381 and pattern seed value 383 from only the pattern element sequence. Typically, the given pattern-element-sequence creation rule is based on an encryption algorithm using the combination of the request-user ID 381 and the pattern seed value 383 as a sort of initial value, as described in more detail below. FIG. 11 is an explanatory conceptual diagram showing a process of creating a presentation pattern 391. In FIG. 11, a pattern element sequence 390 is created based on "User" as a request-user ID 381, and "284E17 - - - 39D0" as a pattern seed value 383. For this purpose, a given numeric sequence is uniquely created based on the combination of the request-user ID 381 and the pattern seed value 383. In an example indicated by the uppermost row and the second row in FIG. 11, the combination of the request-user ID 381 and the pattern seed value 383 expressed in hexadecimal are combined together to create a given numeric sequence. Alternatively, the request-user ID 381 and the pattern seed value 383 may be combined together using any suitable operation, such as addition, subtraction and/or exclusive-OR operation. Then, the given numeric sequence is subjected to an encryption algorithm to create a bit sequence 384 having a given bit length. In FIG. 11, the given bit length is 256 bits which is an information amount enough to create a presentation pattern 391 consisting of sixty four numerals. The encryption algorithm may be any suitable type capable of practically precluding an original numeric sequence from being derived from an algorithmic result, such as a hash function algorithm or a symmetric-key encryption algorithm. For example, SHA-256 may be used as a hash function to encrypt the given numeric sequence so as to create a bit sequence 384 of 256 bits. Alternatively, the Advanced Encryption Standard (AES) algorithm may be used as a symmetric-key encryption algorithm to create a key from the given numeric sequence, and encrypt a 256-bit numeric sequence appropriately pre-set using the key so as to create a bit sequence 384 of 256 bits. Further, a hash function algorithm and a symmetric-key encryption algorithm may be used in combination. The values "0111001011001101 - - - 11010" of the bit sequence 384 in FIG. 11 are shown as one example for illustrative purposes, but not shown as an accurate algorithmic result of the SHA-256 algorithm. Then, the bit sequence 384 of 256 bits is converted to a seventy seven-digit decimal numeral, and a sixty four-digit numeral is extracted therefrom to be used as a pattern element sequence 390. The values "38064655 - - - 1017" of the patter element sequence 390 in FIG. 11 are shown as one example for illustrative purposes, but not shown as an accurate result of the conversion/extraction. The sixty four-digit numeral may be extracted by eliminating unnecessary higher-order bits or lower-order bits, or using any suitable operation, such as subtraction. Then, the pattern display means 355 in the off-line authentication client 351 creates an image of a presentation pattern 391 formed by arranging pattern elements of the pattern element sequence 390, respectively, at element positions in a given pattern format consisting of four 4×4 matrixes, and displays the image on the screen of the off-line authentication client 351 (Step S317). Then, the one-time-password input means 356 in the off-line authentication client 351 allows the user to enter the one-time password 392 therethrough (Step S319). Then, the user authentication means 365 in the off-line authentication client 351 compares a value obtained by subjecting the entered one-time password 392 to the same one-way function algorithm as that used in creating the verification codes 393, with the determined verification code 393, and successfully authenticates the user if then are identical to one another (Step S363).

In the above operational flow, as long as any inconsistency in operational flow, such as a situation where data obviously unusable in a certain step is used in the step, does not occur, the operational flow may be freely modified.

The preferred embodiment of the present invention has been described for illustrative purposes, but the present invention is not limited to the specific embodiment. It is obvious to those skilled in the art that various changes and modifications may be made therein without departing from the spirit and scope thereof as set forth in appended claims.

What is claimed:

1. An off-line user authentication system designed to arrange a plurality of pattern elements in a given pattern format so as to create a presentation pattern to be presented to a user subject to authentication, and apply a one-time-password derivation rule serving as an off-line password of said user to certain ones of the pattern elements included in said presentation pattern at specific positions so as to create a one-time password, said off-line user authentication system comprising:

an off-line authentication support server for managing respective user IDs and passwords of users of the system; and an off-line authentication client serving as a terminal for authenticating the users in an off-line state of being not network-connected while being connectable to said off-line authentication support server via a network, said off-line authentication client includes:

user-ID input section for allowing each of the users to enter his/her user ID therefrom; and user-ID transmitter for transmitting said entered user ID to said off-line authentication support server via the network, wherein said off-line authentication support server includes:

a password storage section for pre-storing respective user IDs and one-time-password derivation rules of the users in associated relation with each other on a user-by-user basis;

pattern generator for generating, in accordance with a given generation rule, a plurality of pattern element sequences each consisting of a set of pattern elements for forming a presentation pattern;

user-ID receiver for receiving the user ID of the user subject to authentication, from said off-line authentication client via the network;

verification-code creation section for applying the one-time-password derivation rule associated with said received user ID to the respective sets of pattern elements included in the presentation patterns formed from the plurality of pattern element sequences generated by said pattern generator, and subjecting the respective obtained results to a one-way function algorithm to create a plurality of verification codes;

pattern transmitter for transmitting said plurality of generated pattern element sequences to the off-line authentication client of said user subject to authentication via the network; and verification-code transmitter for transmitting said plurality of generated verification codes to the off-line authentication client of said user subject to authentication via the network, said off-line authentication client further includes:

pattern receiver for receiving said plurality of pattern element sequences transmitted from said off-line authentication support server, via the network;

pattern storage section for storing said plurality of received pattern element sequences;

verification-code receiver for receiving said plurality of verification codes transmitted from said off-line authentication support server, via the network;

verification-code storage section for storing said plurality of received verification codes;

pattern selector for selecting one of the plurality of pattern element sequences stored in said pattern storage section, to allow said selected pattern element sequence to be used in authenticating said user;

verification-code determination section for determining one of said plurality of verification-codes which corresponds to said selected pattern element sequence;

pattern display section for arranging the pattern elements included in said selected pattern element sequence, in said given pattern format, to create a presentation pattern, and displaying said created presentation pattern on a screen;

one-time-password input section for allowing said user to enter therefrom a one-time password created as a result of applying said one-time-password derivation rule to the pattern elements included in said displayed presentation pattern; and user authentication section for comparing a result of subjecting said entered one-time password to said one-way function algorithm with said determined verification code, and successfully authenticating said user off-line if they are identical to one another.

2. The off-line user authentication system as defined in claim 1, wherein said pattern selector is designed to select one of the remaining stored pattern element sequences except for one which has already been selected for use in authenticating said user, until said off-line authentication client is subsequently connected to said off-line authentication support server to newly receive and store the plurality of pattern element sequences and the plurality of verification codes.

3. The off-line user authentication system as defined in claim 1, wherein said pattern element sequences and said verification codes are encrypted when they are stored in said off-line authentication client.

4. The off-line user authentication system as defined in claim 1, wherein said off-line authentication support server is designed to be activated just after said off-line authentication client is set to an on-line state as a result of a successful user authentication procedure for a connection to the network between said off-line authentication support server and said off-line authentication client by use of said user ID.

5. The off-line user authentication system as defined in claim 1, wherein said one-time-password derivation rule consists of a combination of respective positions of certain ones to be selected from the pattern elements included in the presentation pattern, and a selection order of said certain pattern elements.

6. The off-line user authentication system as defined in claim 5, wherein said one-time-password derivation rule consists of a combination of:

respective positions of certain ones to be selected from the pattern elements included in the presentation pattern; one or more characters to be entered without being based on the presentation pattern; and a selection or input order of said certain pattern elements and said characters.

7. The off-line user authentication system as defined in claim 5, wherein the pattern elements to be included in the presentation pattern are selected from ten numerals of 0 (zero) to 9 and a symbol.

8. The off-line user authentication system as defined in claim 7, wherein the pattern elements to be included in the presentation pattern are selected from ten numerals of 0 (zero) to 9.

9. The off-line user authentication system as defined in claim 8, wherein said given pattern format for use in arranging the plurality of pattern elements to create the presentation pattern includes a matrix having a number m of matrix elements in height and a number n of matrix elements in width to form a rectangular shape in its entirety.

10. An off-line user authentication method for use in an off-line user authentication system designed to arrange a plurality of pattern elements in a given pattern format so as to create a presentation pattern to be presented to a user subject to authentication, and apply a one-time-password derivation rule serving as an off-line password of said user to certain ones of the pattern elements included in said presentation pattern at specific positions so as to create a one-time password, said off-line user authentication system including an off-line authentication support server for managing respective user IDs and passwords of users of the system, and an off-line authentication client for authenticating the users in an off-line state of being not network-connected while being connectable to said off-line authentication support server via a network, said off-line user authentication method comprising:

pre-storing respective user IDs and one-time-password derivation rules of the users in said off-line authentication support server in associated relation with each other on a user-by-user basis;

allowing the user subject to authentication to enter his/her user ID into said off-line authentication client;

transmitting said entered user ID from said off-line authentication client to said off-line authentication support server via the network, receiving said user ID transmitted from said off-line authentication client, at said off-line authentication support server via the network;

allowing said off-line authentication support server to generate, in accordance with a given generation rule, a plurality of pattern element sequences each consisting of a set of pattern elements for forming a presentation pattern;

allowing said off-line authentication support server to apply the one-time-password derivation rule associated with said received user ID to the respective sets of pattern elements included in the presentation patterns formed from the plurality of generated pattern element sequences, and subject the respective obtained results to a one-way function algorithm so as to create a plurality of verification codes;

transmitting said plurality of generated pattern element sequences from said off-line authentication support server to the off-line authentication client of said user subject to authentication, via the network;

transmitting said plurality of generated verification codes from said off-line authentication support server to the off-line authentication client of said user subject to authentication, via the network;

receiving said plurality of pattern element sequences transmitted from said off-line authentication support server, at said off-line authentication client via the network;

storing said plurality of received pattern element sequences in said off-line authentication client;

receiving said plurality of verification codes transmitted from said off-line authentication support server, at said off-line authentication client via the network;

storing said plurality of received verification codes in said off-line authentication client;

allowing said off-line authentication client to select one of the plurality of stored pattern element sequences so as to allow said selected pattern element sequence to be used in authenticating said user;

allowing said off-line authentication client to determine one of said plurality of verification codes which corresponds to said selected pattern element sequence;

allowing said off-line authentication client to arrange the pattern elements included in said selected pattern element sequence, in said given pattern format so as to create a presentation pattern, and display said created presentation pattern on a screen;

allowing said user to enter into said off-line authentication client a one-time password created as a result of applying said one-time-password derivation rule to the pattern elements included in said displayed presentation pattern; and allowing said off-line authentication client to compare a result of subjecting said entered one-time password to said one-way function algorithm with said determined verification code, and successfully authenticate said user off-line if they are identical to one another.

11. An off-line authentication client serving as a terminal for authenticating a user subject to authentication, off-line, in an off-line user authentication system designed to arrange a plurality of pattern elements in a given pattern format so as to create a presentation pattern to be presented to said user, and apply a one-time-password derivation rule serving as an off-line password of said user to certain ones of the pattern elements included in said presentation pattern at specific positions so as to create a one-time password, said off-line authentication client comprising:

pattern input section for pre-receiving a plurality of pattern element sequences pre-generated in accordance with a given generation rule, each of said pattern element sequences consisting of a set of pattern elements for forming a presentation pattern;

pattern storage section for pre-storing said plurality of pre-received pattern element sequences;

verification-code input section for pre-receiving a plurality of verification codes pre-created by applying the one-time-password derivation rule serving as a password associated with the user subject to authentication to the respective sets of pattern elements included in the presentation patterns formed from said plurality of pre-received pattern element sequences, and subjecting the respective obtained results to a one-way function algorithm;

verification-code storage section for pre-storing said plurality of pre-received verification codes;

user-ID input section for allowing the user subject to authentication to enter his/her user ID therefrom;

pattern selector for selecting one of the plurality of pattern element sequences pre-stored in said pattern storage section, to allow said selected pattern element sequence to be used in authenticating said user;

verification-code determination section for determining one of said plurality of verification-codes which corresponds to said selected pattern element sequence;

pattern display section for arranging the pattern elements included in said selected pattern element sequence, in said given pattern format, to create a presentation pattern, and displaying said created presentation pattern on a screen;

one-time-password input section for allowing said user subject to authentication to enter therefrom a one-time password created as a result of applying said one-time-password derivation rule to the pattern elements included in said displayed presentation pattern; and user authentication section for comparing a result of subjecting said entered one-time password to said one-way function algorithm with said determined verification code, and successfully authenticating said user off-line if they are identical to one another.

12. An off-line authentication method for use in an off-line authentication client device serving as a terminal for authenticating a user subject to authentication, off-line, in an off-line user authentication system designed to arrange a plurality of pattern elements in a given pattern format so as to create a presentation pattern to be presented to said user, and apply a one-time-password derivation rule serving as an off-line password of said user to certain ones of the pattern elements included in said presentation pattern at specific positions so as to create a one-time password, said off-line authentication method comprising:

pre-receiving a plurality of pattern element sequences pre-generated in accordance with a given generation rule, each of said pattern element sequences consisting of a set of pattern elements for forming a presentation pattern;

pre-storing said plurality of pre-received pattern element sequences;

pre-receiving a plurality of verification codes pre-created by applying the one-time-password derivation rule serving as a password associated with the user subject to authentication to the respective sets of pattern elements included in the presentation patterns formed from said plurality of pre-received pattern element sequences, and subjecting the respective obtained results to a one-way function algorithm;

pre-storing said plurality of pre-received verification codes;

allowing the user subject to authentication to enter his/her user ID;

selecting one of the plurality of pre-stored pattern element sequences to allow said selected pattern element sequence to be used in authenticating said user;

determining one of said plurality of verification-codes which corresponds to said selected pattern element sequence;

arranging the pattern elements included in said selected pattern element sequence, in said given pattern format, to create a presentation pattern, and displaying said created presentation pattern on a screen;

allowing said user subject to authentication to enter a one-time password created as a result of applying said one-time-password derivation rule to the pattern elements included in said displayed presentation pattern; and comparing, by the off-line authentication client device, a result of subjecting said entered one-time password to said one-way function algorithm with said determined verification code, and successfully authenticating said user off-line if they are identical to one another.

13. A non-transitory computer-readable storage medium storing an off-line authentication program that causes an off-line computer in an off-line user authentication system to execute an off-line authentication method, said off-line user authentication system being designed to arrange a plurality of pattern elements in a given pattern format so as to create a presentation pattern to be presented to a user subject to authentication, and apply a one-time-password derivation rule serving as an off-line password of said user to certain ones of the pattern elements included in said presentation pattern at specific positions so as to create a one-time password, said off-line authentication method comprising:

pre-receiving a plurality of pattern element sequences pre-generated in accordance with a given generation rule, each of said pattern element sequences consisting of a set of pattern elements for forming a presentation pattern;

pre-storing said plurality of pre-received pattern element sequences;

pre-receiving a plurality of verification codes pre-created by applying the one-time-password derivation rule serving as a password associated with the user subject to authentication to the respective sets of pattern elements included in the presentation patterns formed from said plurality of pre-received pattern element sequences, and subjecting the respective obtained results to a one-way function algorithm;

pre-storing said plurality of pre-received verification codes;

allowing the user subject to authentication to enter his/her user ID;

selecting one of the plurality of pre-stored pattern element sequences to allow said selected pattern element sequence to be used in authenticating said user;

determining one of said plurality of verification-codes which corresponds to said selected pattern element sequence;

arranging the pattern elements included in said selected pattern element sequence, in said given pattern format, to create a presentation pattern, and displaying said created presentation pattern on a screen;

allowing said user subject to authentication to enter a one-time password created as a result of applying said one-time-password derivation rule to the pattern elements included in said displayed presentation pattern; and comparing a result of subjecting said entered one-time password to said one-way function algorithm with said determined verification code, and successfully authenticating said user off-line if they are identical to one another.

14. The non-transitory computer-readable storage medium as defined in claim 13, which is a logon authentication program configured to be called in response to setting of an OS during a start up process of said OS.

* * * * *